US007235778B2

United States Patent
Asai

(10) Patent No.: US 7,235,778 B2
(45) Date of Patent: Jun. 26, 2007

(54) OPTICAL SCANNER REFLECTING AND OUTPUTTING LIGHT WITH CONTROLLED INTENSITY AND IMAGE FORMING APPARATUS USING SAME

(75) Inventor: Nobuaki Asai, Hashima-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/390,102

(22) Filed: Mar. 28, 2006

(65) Prior Publication Data
US 2006/0169880 A1 Aug. 3, 2006

Related U.S. Application Data

(63) Continuation of application No. PCT/JP2004/012964, filed on Sep. 7, 2004.

(30) Foreign Application Priority Data
Sep. 30, 2003 (JP) ............................. 2003-339151

(51) Int. Cl.
*H01J 5/16* (2006.01)
(52) U.S. Cl. ...................................... 250/235; 250/205
(58) Field of Classification Search ................ 250/235, 250/236, 205, 216, 208.1; 359/196–226
See application file for complete search history.

(56) References Cited

U.S. PATENT DOCUMENTS

| 5,165,074 A | 11/1992 | Melino |
| 5,844,707 A * | 12/1998 | Minakuchi et al. ......... 359/204 |

FOREIGN PATENT DOCUMENTS

| JP | A-01-237637 | 9/1989 |
| JP | A-04-255874 | 9/1992 |
| JP | A-05-276317 | 10/1993 |
| JP | A-06-098104 | 4/1994 |
| JP | A-09-258130 | 10/1997 |
| JP | A-11-203383 | 7/1999 |
| JP | A-2002-131670 | 5/2002 |
| JP | A-2002-182147 | 6/2002 |
| JP | B2-3372265 | 11/2002 |
| JP | A-2003-005119 | 1/2003 |
| JP | A-2003-057586 | 2/2003 |

* cited by examiner

*Primary Examiner*—Que T. Le
(74) *Attorney, Agent, or Firm*—Oliff & Berridge, PLC

(57) ABSTRACT

An optical scanner is disclosed which includes: a reflective surface from which incoming light is reflected; a scanning mechanism altering a reflective-surface angle of the reflective surface, relative to an entry direction in which the incoming light enters the reflective surface, to thereby scan reflected light from the reflective surface; and a controller controlling an intensity of the incoming light, depending on the reflective-surface angle.

9 Claims, 16 Drawing Sheets

OPTICAL SCANNER REFLECTING AND OUTPUTTING LIGHT WITH CONTROLLED INTENSITY AND IMAGE FORMING APPARATUS USING SAME

CROSS-REFERENCE TO RELATED APPLICATIONS

This application is based on Japanese Patent Applications No. 2003-339151 filed Sep. 30, 2003, and PCT International Patent Application No. PCT/JP2004/12964 filed Sep. 7, 2004, the contents of which are incorporated hereinto by reference.

This is a continuation of International Application No. PCT/JP2004/12964 filed Sep. 7, 2004, which was published in Japanese under PCT Article 21(2).

BACKGROUND OF THE INVENTION

1. Field of the Invention

The invention relates to an optical scanner altering an angle of a reflective surface reflecting the incoming light, relative to an entry direction in which the incoming light enters the reflective surface, to thereby scan reflected light from the reflective surface, and more particularly to technologies of controlling the intensity of the reflected light from the reflective surface.

2. Description of the Related Art

There are known as optical scanners for scanning light, such a type of an optical scanner that alters an angle of a reflective surface reflecting the incoming light, relative to an entry direction in which the incoming light enters the reflective surface, to thereby scan the reflected light from the reflective surface. See, for example, Japanese Patent Application Publication No. HEI 11-203383.

Such an optical scanner is used in many various fields, such as image forming, and image reading. In the field of image forming, such an optical scanner is applied to retinal scanning type display devices which scan a beam of light on the retina of a viewer for direct presentation of a desired image onto the retina; projectors; laser printers; devices for use in laser lithography; or other applications. In the field of image reading, such an optical scanner is applied to facsimile machines; copiers; image scanners; bar-code readers; or other applications.

An example of such an optical scanner is of a type in which oscillation of a reflective surface achieves the scanning of light. Another example of such an optical scanner is of a type in which unidirectional rotation of a reflective surface achieves the scanning of light.

As disclosed in Japanese Patent Application Publication No. HEI 11-203383, an example of the above-described oscillating type optical scanner is constructed to include a mirror for reflecting light; and a vibrating body for torsion-vibrating the mirror.

While this example falls within a type of an optical scanner that performs the oscillation of a reflective surface through its vibration, there exists an alternative type of an optical scanner that performs the oscillation of a reflective surface without through its vibration. A more specific example of the alternative type is an optical scanner utilizing a galvano mirror.

In contrast, an example of the above-described rotating type optical scanner is constructed to utilize a polygon mirror having a plurality of adjacent mirror facets in succession around the polygon mirror. The optical scanner utilizing the polygon mirror differs in that successive uses of the plurality of mirror facets achieve repeated scans, from the optical scanner oscillating a reflective surface in which continuous use of the same reflective surface achieves repeated scans.

BRIEF SUMMARY OF THE INVENTION

In the optical scanner described above, whether or not the reflected light from the reflective surface has a desired level of intensity depends on the angle of the reflective surface relative to the incoming light.

For example, in general, an optical scanner utilizes, in order to reduce differences in the start-of-scan timing between successive scan lines, a photo-detector detecting a specified beam of light reflected from the optical scanner which has been just deflected by the optical scanner to a desired angular position.

In addition, it is also general that the ensured detection by the photo-detector of the incoming light should require a given level of intensity of the incoming light. The photo-detector and the optical scanner, however, fail to share the same requirements for the intensity of the incoming light, in some cases.

That is to say, in those cases, the maximization of the intensity of the incoming light is preferable to the photo-detector, while the placement of an upper limit on the intensity of the incoming light is preferable to the optical scanner for the intended purposes.

On the other hand, in general, a photo-detector is located relative to an optical scanner including a reflective surface, such that the photo-detector receives the reflected light from the reflective surface when the reflective surface is oriented at angles other than angles at which the reflective surface is to be oriented for allowing the optical scanner to perform its substantial functions.

This follows that the angle of the reflective surface is varied between when the reflected light from the reflective surface enters the photo-detector and when the optical scanner performs its substantial functions.

Of the above, the present inventor has derived the findings that varying the intensity of the incoming light of the reflective surface in accordance with the angle of the reflective surface, such that the intensity increases when the reflected light attempts to enter the photo-detector, while the intensity decreases when the optical scanner attempts to perform its substantial functions, allows co-fulfillment of both requirements of the photo-detector and of the optical scanner to perform its substantial functions.

It is therefore an object of the present invention to provide an optical scanner which alters an angle of a reflective surface reflecting the incoming light, relative to an entry direction in which the incoming light enters the reflective surface, to thereby scan reflected light from the reflective surface, and which allows the intensity of the reflected light from the reflective surface to be optimized.

According to a first aspect of the present invention, an optical scanner is provided which comprises:

a reflective surface from which incoming light is reflected;

a scanning mechanism altering a reflective-surface angle of the reflective surface, relative to an entry direction in which the incoming light enters the reflective surface, to thereby scan reflected light from the reflective surface; and a controller controlling an intensity of the incoming light, depending on the reflective-surface angle.

According to a second aspect of the present invention, an apparatus for forming an image by scanning a beam of light is provided.

The apparatus comprises:

a light source emitting the beam of light; and a scanning unit scanning the beam of light emitted from the light source, the scanning unit including an optical scanner, wherein the optical scanner comprises:

a reflective surface from which an incoming beam of light from the light source is reflected;

a scanning mechanism altering a reflective-surface angle of the reflective surface, relative to an entry direction in which the incoming beam of light enters the reflective surface, to thereby scan reflected light from the reflective surface; and a controller controlling an intensity of the incoming beam of light, depending on the reflective-surface angle.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
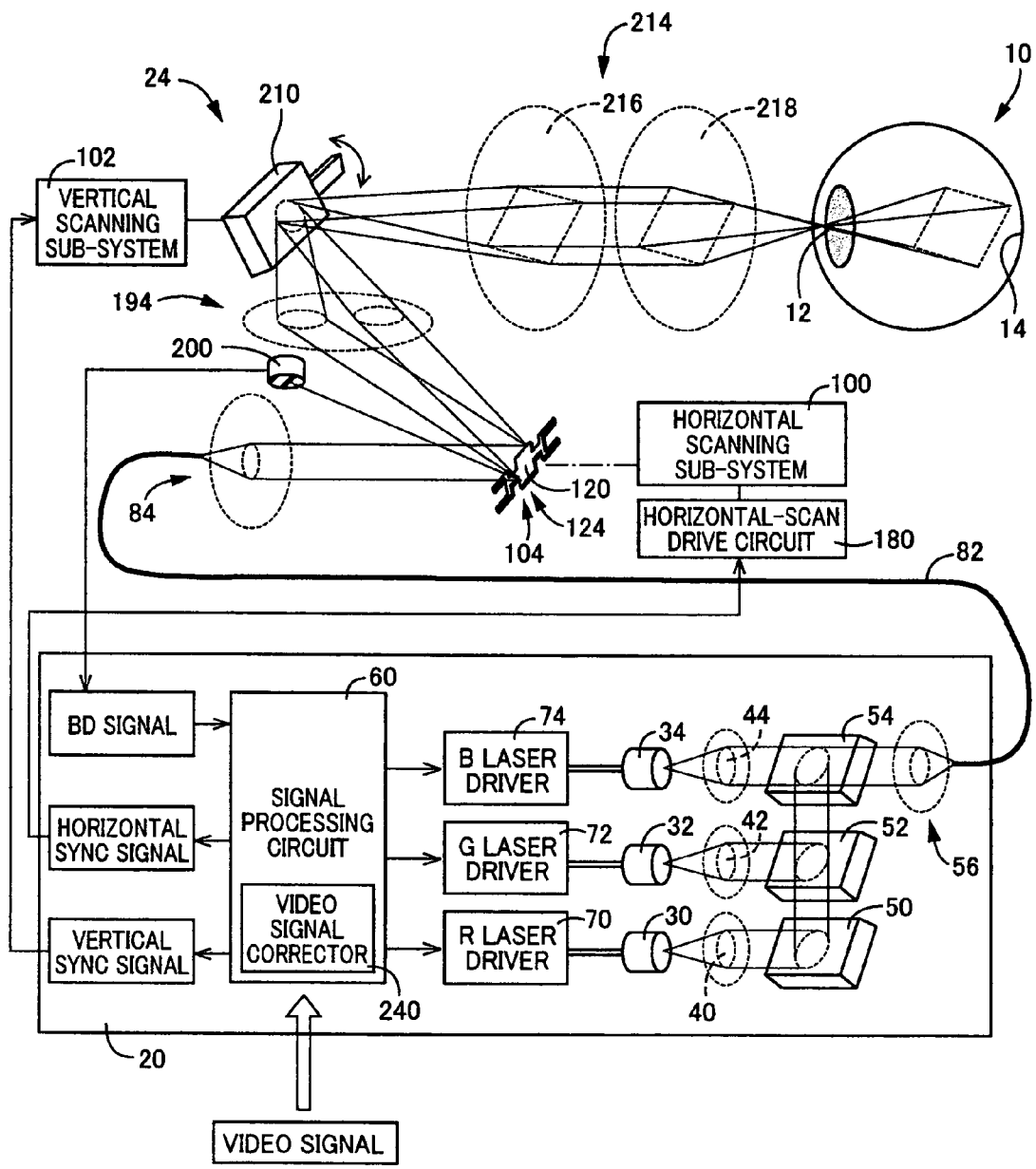
FIG. 1 is a schematic view illustrating a retinal scanning type display device including an optical scanner 104 constructed according to a first embodiment of the present invention.

The object mentioned above may be achieved according to any one of the following modes of this invention.

These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features, where appropriate.

(1) An optical scanner comprising:

a reflective surface from which incoming light is reflected;

a scanning mechanism altering a reflective-surface angle of the reflective surface, relative to an entry direction in which the incoming light enters the reflective surface, to thereby scan reflected light from the reflective surface; and a controller controlling an intensity of the incoming light, depending on the reflective-surface angle.

The optical scanner according to the above mode (1) allows the optimization of the intensity of the incoming light to the reflective surface, relative to the angle of the reflective surface which affects the intensity of the reflected light from the reflective surface, resulting in the optimization of the intensity of the reflected light from the reflective surface, in other words, scanning light exiting the reflective surface.

The optical scanner according to the above mode (1) may be constructed to be, for example, of an oscillating type described above, or of a unidirectional rotating type described above.

In addition, in the optical scanner according to the above mode (1), the incoming light of the reflective surface may be formed as parallel light uniform in transverse cross-sectional area along the traveling direction of the light, or as convergent light or divergent light varying in transverse cross-sectional area along the traveling direction of the light.

(2) The optical scanner according to mode (1), wherein the incoming light is varied in transverse cross-sectional area on the reflective surface, as a function of the reflective-surface angle, and wherein the controller varies the intensity of the incoming light as a function of the reflective-surface angle, so as to reduce an amount of variation in an intensity of the reflected light from the reflective surface due to variation of the reflective-surface angle.

The optical scanner according to the previous mode (1), for achieving higher resolution, is required in some cases, to be configured to concurrently achieve an increased scan rate, an increased scan amplitude (the magnitude of the oscillation during scan), and a maximized area of a transverse cross-section of the reflected light from the reflective surface, namely, the scanning light produced by the instant optical scanner.

In this context, the "transverse cross-sectional area" means, when the reflected light is, for example, in the form of a beam of light having a circular cross section, the area of a circle identical in diameter to the beam of light. In this example, there is established a relationship for the reflected light that the larger the beam diameter, the larger the transverse cross-sectional area.

The increase in the transverse cross-sectional area of the reflected light requires the increase in the transverse cross-sectional area of the incoming light of the reflective surface in the optical scanner. In addition, the larger the area of the reflective surface, the more easily the transverse cross-sectional area of the incoming light can be increased.

Usually, there is a limitation in increasing the area of the reflective surface. In the presence of such a limitation, two cases can be considered.

In the first case, the illuminating light directed toward the reflective surface for scanning is dimensioned to have a transverse cross-sectional area relatively small enough to cause the illuminating light to enter the reflective surface without overflow therefrom. In this case, the illuminating light is identical to the incoming light.

In contrast, in the second case, the illuminating light is dimensioned to have a transverse cross-sectional area relatively large enough to allow the illuminating light to be in-part overflowed away from the reflective surface. In this case, the illuminating light is so wide that the illuminating light is divided into a desired segment of light identical to the incoming light, and an undesired segment of light not identical to the incoming light.

The comparison between these two different cases suggests that the deployment of the limited entire area of the reflective surface for optical scanning is more difficult in the first case than in the second case.

If the illuminating light directed toward the reflective surface is defined to include a desired segment of light entering the reflective surface, and an undesired segment of light failing to enter the reflective surface, then it becomes more easily to deploy the limited entire area of the reflective surface for optical scanning.

When the illuminating light is defined in transverse cross-section to allow the creation of the undesired segment of light, the transverse cross-section of the incoming light of the reflective surface, namely, the desired segment of light is varied as a function of an angle (hereinafter, referred to also as "reflective-surface angle") of the reflective surface relative to the entry direction of the incoming light.

The area of the transverse cross-section is coincident with the area of an entrance region in which the incoming light enters the reflective surface, as projected in the entry direction of the incoming light (i.e., as projected onto a flat plane perpendicular to the entry direction of the incoming light). The area of the entrance region as projected in that manner will be referred to as "projection area of the entrance region."

This results in variations in the intensity of the reflected light from the reflective surface with variations in the reflective-surface angle, with the scanning light produced the optical scanner being unstable.

In contrast, the optical scanner constructed according to the above mode (2) enables reduction in variations in the intensity of the reflected light from the reflective surface with variations in the reflective-surface angle, even though the transverse cross-sectional area of the incoming light relative to the reflective surface, which is equivalent to the projection area of the entrance region, is varied as a function of the reflective-surface angle.

The optical scanner according to the above mode (2), therefore, makes it more easily to stabilize or uniform the intensity of the reflected light, namely, the scanning light, over time.

The "transverse cross-sectional area" set forth in the above mode (2) means an area of a figure which, once the incoming light is made to strike a flat plane perpendicular to an optical axis of the incoming light, is generated on the flat plane. If the incoming light is, for example, a beam of light having a circular cross section, then the transverse cross-sectional area means an area of a circle defined by a beam diameter of the beam of light. In this case, there is established a relationship that the larger the beam diameter, the larger the transverse cross-sectional area.

The "incoming light" set forth in the above mode (2) maybe formed as parallel light uniform in transverse cross-sectional area over the travel of the parallel light, or as convergent or divergent light varied in transverse cross-sectional area over the travel of the corresponding light.

In the case where the "incoming light" set forth in the above mode (2) is in the form of parallel light, the geometrical establishment or determination of the transverse cross-sectional area is not conditional.

On the other hand, in the case where the "incoming light" is in the form of convergent or divergent light (i.e., non-parallel light), the geometrical establishment or determination of the transverse cross-sectional area is conditional, and therefore, in the above mode (2), the transverse cross-sectional area of the incoming light is defined as a transverse cross-section relative to the reflective surface.

This follows, in this case, that the transverse cross-sectional area of the incoming light means a projection area of an entrance region in which the incoming light enters the reflective surface, which is an area of a theoretical entrance region obtained by projecting the actual entrance region in the entry direction of the incoming light, on a flat plane perpendicular to the entry direction.

As a result, in this case, although the incoming light is in the form of non parallel light, the transverse cross-sectional area can be geometrically established.

(3) The optical scanner according to mode (1) or (2), wherein the optical scanner is for use in combination with a light source emitting light toward the reflective surface and modulating an intensity of the light to be emitted from the light source, in accordance with a first signal, wherein the controller controls the first signal to be supplied to the light source, depending on the reflective-surface angle.

The optical scanner according to the above mode (3) enables the optimization of the intensity of the reflected light from the reflective surface, as a result of the modulation, by the use of a light source capable of modulating the intensity of exit light from the light source, of the intensity of the exit light from the light source.

The phrase "the optical scanner is for use in combination with a light source" set forth in the above mode (3) is interpreted to mean, when the light source is formed separately from the instant optical scanner, that the instant optical scanner is used together with the light source.

The interpretation of the above phrase does not exclude an arrangement in which the instant optical scanner is constructed to include the light source as a part of the optical scanner.

That is to say, in this context, irrespective of whether or not the instant optical scanner includes the light source as a part of the optical scanner, the above phrase is interpreted to merely mean that the light source is utilized for scan by the instant optical scanner. This interpretation is applicable on the following modes.

(4) The optical scanner according to mode (1) or (2), wherein the optical scanner is for use in combination with a light source emitting light toward the reflective surface and a modulator modulating an intensity of the light which has been emitted from the light source, in accordance with a second signal, wherein the controller controls the second signal to be supplied to the modulator, depending on the reflective-surface angle.

The optical scanner according to the above mode (4) enables the optimization of the intensity of the reflected light from the reflective surface, as a result of the modulation, by the use of a modulator capable of modulating the intensity of exit light from a light source, of the intensity of the exit light from the light source.

Therefore, the optical scanner according to the above mode (4) enables the control of the intensity of the incoming light of the reflective surface, without depending on the light source.

In general, intensity modulation of the incoming light using at least one light source is performed by utilizing at least one of three light sources individually provided for three principal colors. For this reason, in this case, it is of importance to pay attention for avoiding variations in the balance between colors composing a desired image, between before and after the intensity modulation of the incoming light.

In this regard, the optical scanner according to the above mode (4) may be practiced in an arrangement in which a common modulator is disposed for modulating the intensity of a composite beam of light generated by combining three sub-beams of light of three principal colors.

This arrangement makes it easier to avoid variations in the balance between colors composing a desired image, between before and after the intensity modulation of the incoming light.

Further, the optical scanner according to the above mode (4) may be also practiced in an arrangement in which the modulator is disposed to allow exiting light from the modulator to directly enter the reflective surface of the instant optical scanner, without passing through any intervening optics.

This arrangement avoids the light, upon modulated in intensity by the modulator, from being adversely affected by other optics, before entering the reflective surface. Therefore, this arrangement enables promotion in precisely modulating the intensity of the incoming light of the reflective surface.

(5) An apparatus for forming an image by scanning a beam of light, comprising:

a light source emitting the beam of light; and a scanning unit scanning the beam of light emitted from the light source, the scanning unit including an optical scanner, wherein the optical scanner comprises:

a reflective surface from which an incoming beam of light from the light source is reflected;

a scanning mechanism altering a reflective-surface angle of the reflective surface, relative to an entry direction in which the incoming beam of light enters the reflective surface, to thereby scan reflected light from the reflective surface; and a controller controlling an intensity of the incoming beam of light, depending on the reflective-surface angle.

The optical scanner set forth in the above mode (5) may be practiced in combination with at least one of the technical features described in the preceding modes (2) through (4).

(6) The apparatus according to mode (5), wherein the light source modulates an intensity of the beam of light emitted from the light source, in accordance with an image signal corresponding to the image, and wherein the controller includes a signal corrector correcting the image signal to be supplied to the light source, depending on the reflective-surface angle.

The apparatus according to the above mode (6) allows the optimization of the intensity of the reflected light from the reflective surface, as a result of the correction of the image signal depending on the reflective-surface angle, the image signal being supplied to the light source for achieving an intended application of image formation.

The apparatus according to the above mode (6) may be practiced in an arrangement in which the intensity-modulation function provided by the light source is utilized for both the image formation and the intensity-optimization of the reflected light.

This arrangement makes it inessential for the intensity optimization of the reflected light to require the incorporation of hardware having an exclusive purpose of intensity modulation. This arrangement therefore makes it easier to avoid the number of components of the instant apparatus from being increased for optimizing the intensity of the reflected light.

(7) The apparatus according to mode (5) or (6), further comprising a modulator modulating the intensity of the beam of light emitted from the light source, in accordance with a modulation signal, wherein the controller includes a signal generator generating the modulation signal, depending on the reflective-surface angle, and delivering the generated modulating signal to the modulator.

The apparatus according to the above mode (7) allows the optimization of the intensity of the reflected light from the reflective surface, as a result of the control of the modulator, depending on the reflective-surface angle, the modulator modulating the intensity of the beam of light emitted from the light source.

The apparatus according to the above mode (7) therefore allows the intensity modulation for optimizing the intensity of the reflected light, to be performed independently of the intensity modulation for forming images.

(8) The apparatus according to anyone of modes (5) through (7), wherein the light source emits the beam of light toward the reflective surface, such that the emitted beam of light is so dimensioned in transverse cross-section as to together generate a desired segment of light entering the reflective surface and an undesired segment of light not entering the reflective surface.

As described above, with the area of the reflective surface having a limitation in being increased, the deployment of the limited entire area of the reflective surface for optical scanning is more difficult when the illuminating light, which illuminates the reflective surface for scanning, is dimensioned to have a transverse cross-section causing the illuminating light to enter the reflective surface without overflow therefrom, than when the illuminating light is dimensioned to have a transverse cross-section allowing the illuminating light to be in-part overflowed away from the reflective surface.

This fact is found remarkable in particular when the transverse cross-section of the illuminating light and the reflective surface are greatly different in shape from each other, such as when the illuminating light is circular in transverse cross-section, while the reflective surface is rectangular.

Further, in general, for an optical scanner which is configured to satisfy the light-entrance condition that the illuminating light must enter the reflective surface without overflow therefrom, the illuminating light is dimensioned such that its transverse cross-section is smaller than the reflective surface, for continuously satisfying the light-entrance condition irrespective of unintended variations in quality between manufactures and temporal changes in quality of individual manufactures.

In view of the above, it is found that, even where the transverse cross-section of the illuminating light and the reflective surface are similar in shape to each other, such as when these shapes both are circular, the deployment of the limited entire area of the reflective surface for optical scanning is more difficult when the illuminating light is dimensioned to have a transverse cross-section causing the illuminating light to enter the reflective surface without overflow therefrom, than when the illuminating light is dimensioned to have a transverse cross-section allowing the illuminating light to be in-part overflowed away from the reflective surface.

In view of the above findings, the apparatus according to the above mode (8) is configured to include the light source so as to emit a beam of light toward the reflective surface, such that the emitted beam of light is so dimensioned in transverse cross-section as to together generate a desired segment of light entering the reflective surface and an undesired segment of light not entering the reflective surface.

The apparatus according to the above mode (8) therefore enables the configuration of the transverse cross-section of light emitted from the light source to the reflective surface, with the emitted light being allowed to include an undesired segment of light, resulting in enhanced deployment of the limited entire area of the reflective surface for optical scanning.

The "transverse cross-section" set forth in the above mode (8) means a figure, once the incoming light strikes a flat plane perpendicular to an optical axis of the incoming light, is formed on the flat plane. Therefore, if the incoming light is, for example, in the form of a beam of light having a circular section, then the transverse cross-section means a circle featured by a beam diameter of the beam of light.

Further, the "transverse cross-section" set forth in the above mode (8) is no more than a cross section allowing concurrent generation of a desired and an undesired segment of light as a result of the impingement of a beam of light on the reflective surface. By the definition, the "transverse cross-section" of light emitted from the light source (i.e., the illuminating light from the light source to the reflective surface) is not required to be dimensioned such that the desired segment of light completely fills an entire region of the reflective surface.

That is to say, the "transverse cross-section" of light emitted from the light source may be dimensioned so as to form a local region on the reflective surface which the desired segment of light does not fill.

(9) The apparatus according to mode (8), wherein the scanning unit includes:

a primary scanning sub-system scanning the beam of light emitted from the light source in a primary scan direction; and a secondary scanning sub-system scanning the beam of light emitted from the light source in a secondary scan direction intersecting the primary scan direction at a rate lower than that of the primary scanning sub-system, wherein the primary scanning sub-system includes the optical scanner, and wherein the controller controls an intensity of the incoming beam of light entering the reflective surface, depending on the reflective-surface angle of the reflective surface included in the optical scanner for use in the primary scanning sub-system.

As described above, higher resolution of images requires an increase in the transverse cross-sectional area of the reflected light from the reflective surface.

In this regard, the apparatus according to the preceding mode (5), because of its employment of the optical scanner constructed according to any one of the further preceding modes (1) through (4), enhances the easiness with which the transverse cross-sectional area can become large for the area of the reflective surface.

This induces that the required area of the reflective surface can become small for the area of the transverse cross-section of the reflected light, and eventually induces that the required weight of a reflective mirror member of the reflective surface can become small for the area of the transverse cross-section of the reflected light.

On the other hand, there is found the tendency that the heavier the reflective mirror member, the lower the scanning frequency of the reflective surface.

The apparatus according to the above mode (9) is configured to include: a primary scanning sub-system scanning the beam of light emitted from the light source in a primary scan direction; and a secondary scanning sub-system scanning the beam of light emitted from the light source in a secondary scan direction intersecting the primary scan direction at a rate lower than that of the primary scanning sub-system.

The comparison between the primary and secondary scanning sub-systems in the scanning frequency to be achieved suggests that the primary scanning sub-system is higher in the scanning frequency than the secondary scanning sub-system, meaning that the primary scanning sub-system encounters more difficulties in achieving a desired scanning frequency than the secondary scanning sub-system does.

In contrast, the employment of the optical scanner constructed according to any one of the preceding modes (1) through (4) makes it easier to achieve higher resolution while avoiding reduction in the scanning frequency, as described above.

In view of the above, the apparatus according to the above mode (9) is configured to employ the optical scanner constructed according to any one of the preceding modes (1) through (4) as the primary scanning sub-system, which scans the beam of light at a higher rate or a higher frequency than the secondary scanning sub-system.

The apparatus according to the above mode (9) therefore makes it easier to allow the primary scanning sub-system, which originally encounters more difficulties in concurrently achieving both enhanced resolution and an increased frequency of scanning than the secondary scanning sub-system, to successfully concurrently achieve both enhanced resolution and an increased frequency of scanning.

The optical scanner set forth in the above mode (9) may be practiced in combination with at least one of the technical features described in the preceding modes (2) through (4).

(10) The apparatus according to any one of modes (5) through (9), further comprising optics directing the beam of light scanned by the scanning unit, toward the retina of the viewer.

Several presently preferred embodiments of the invention will be described in more detail by reference to the drawings in which like numerals are used to indicate like elements throughout.

Referring now to FIG. 1, there is schematically illustrated a retinal scanning type display device constructed in accordance with a first embodiment of the present invention.

The retinal scanning type display device (hereinafter, abbreviated as "RSD") is adapted to direct a laser beam, through a pupil 12 of a viewer's eye 10, into an image plane on a retina 14 of the viewer, while appropriately modulating the laser beam in intensity (optionally with its curvature of wavefront). The RSD is further adapted to scan the laser beam two-dimensionally on the image plane, to thereby directly project a desired image onto the retina 14.

The RSD includes a light source unit 20 and a scanning unit 24 which is disposed between the light source unit 20 and the viewer's eye 10.

In order to generate a beam of laser light of any desired color by combining sub-beams of laser light of three primary colors (i.e., red, green, and blue), the light source unit 20 includes a laser 30 emitting a sub-beam of red colored laser light, a laser 32 emitting a sub-beam of green colored laser light, and a laser 34 emitting a sub-beam of blue colored laser light. These lasers 30, 32, and 34 each may be in the form of, for example, a semiconductor laser.

The sub-beams of laser light of three primary colors emitted from the respective lasers 30, 32, and 34, after collimation by respective collimating optical systems 40, 42, and 44, enter respective dichroic mirrors 50, 52, and 54 all of which are wavelength-selective. This is for causing the sub-beams of laser light to be selectively reflected from or transmitted through the respective dichroic mirrors 50, 52, and 54, in response to the wavelengths of these sub-beams of laser light, to thereby eventually combine the sub-beams of laser light.

More specifically, the sub-beam of red colored light emitted from the laser 30, after collimation by the collimating optical system 40, enters the dichroic mirror 50. The sub-beam of green colored light emitted from the laser 32, after collimation by the collimating optical system 42, enters the dichroic mirror 52. The sub-beam of blue colored light emitted from the laser 34, after collimation by the collimating optical system 44, enters the dichroic mirror 54.

The sub-beams of laser light of three primary colors, upon entry into the respective dichroic mirrors 50, 52, and 54, are combined together at the dichroic mirror 54, which is a representative one of the dichroic mirrors 50, 52, and 54. The combined sub-beams of laser light enter a combining optical system 56 for convergence.

Although the optical section of the light source unit 20 has been described above, then there will be described the electrical section of the light source unit 20.

The light source unit 20 includes a signal processing circuit 60 principally made by a computer. The signal processing circuit 60 is configured to perform, in response to an externally-supplied video signal, signal processing for driving the lasers 30, 32, and 34; and signal processing for implementing a scanning operation of the combined beam of laser.

In operation, the signal processing circuit 60 supplies drive signals for driving the lasers 30, 32, and 34, in response to the externally-supplied vide signal, for per pixel on the desired image to be projected onto the retina 14. These drive signals, which are required for the desired color and intensity of the combined beam of laser, are routed to the corresponding respective lasers 30, 32, and 34 via corresponding respective laser drivers 70, 72, and 74. The signal processing for scanning the laser beam will be described below.

The light source unit 20 described above emits the combined beam of laser at the combining optical system 56. The laser beam, after emerging from the combining optical system 56, enters and passes through an optical fiber 82 and a collimating optical system 84 in the description order, into the scanning unit 24. The optical fiber 82 functions as a light transmissive media or optical guide, and the collimating optical system 84 collimates the laser beam exiting divergently the optical fiber 82 at its rearward end.

The scanning unit 24 includes a horizontal scanning sub-system 100 and a vertical scanning sub-system 102.

The horizontal scanning sub-system 100 is an optical system for performing a horizontal scan (which is an example of a primary scan) in the form of a raster scan in which a laser beam is scanned along a plurality of horizontal scan lines, on a frame-by-frame basis, for an image to be displayed.

In contrast, the vertical scanning sub-system 102 is an optical system performing a vertical scan (which is an example of a secondary scan) in which a laser beam is scanned vertically from the primary scan line to the last scan line, on a frame-by-frame basis, for an image to be displayed.

The horizontal scanning sub-system 100 is configured to scan a laser beam at a rate or frequency higher than that of the vertical scanning sub-system 102.

More specifically, in the present embodiment, the horizontal scanning sub-system 100 includes an optical scanner 104. The optical scanner 104 has an elastic material provided with a mirror for performing mechanical deflection. The mirror is angularly oscillated by vibration of the elastic material. The optical scanner 104 is controlled in response to a horizontal sync signal supplied from the signal processing circuit 60.

Figure 2:
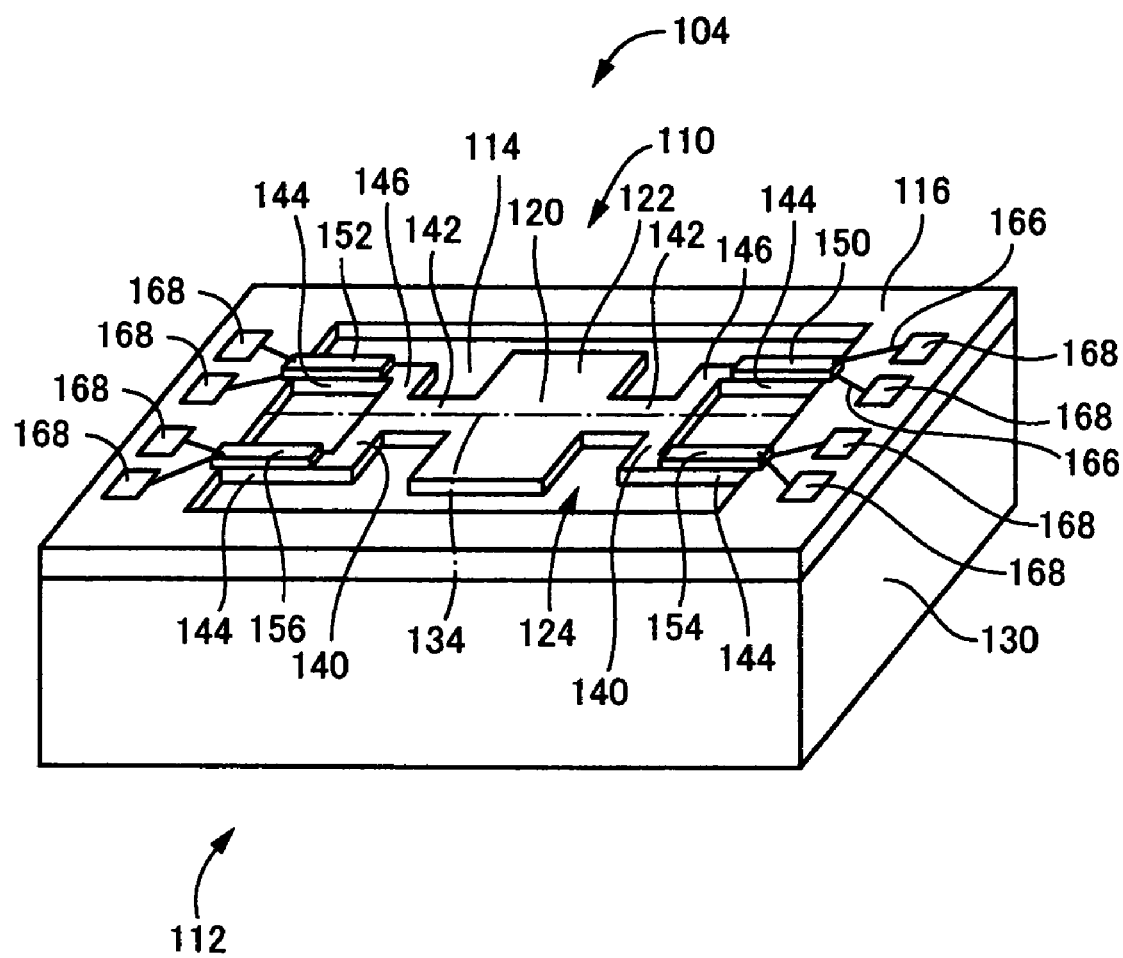
FIG. 2 is a perspective view illustrating the optical scanner 104 in an assembled state, as depicted in FIG. 1.
Figure 3:
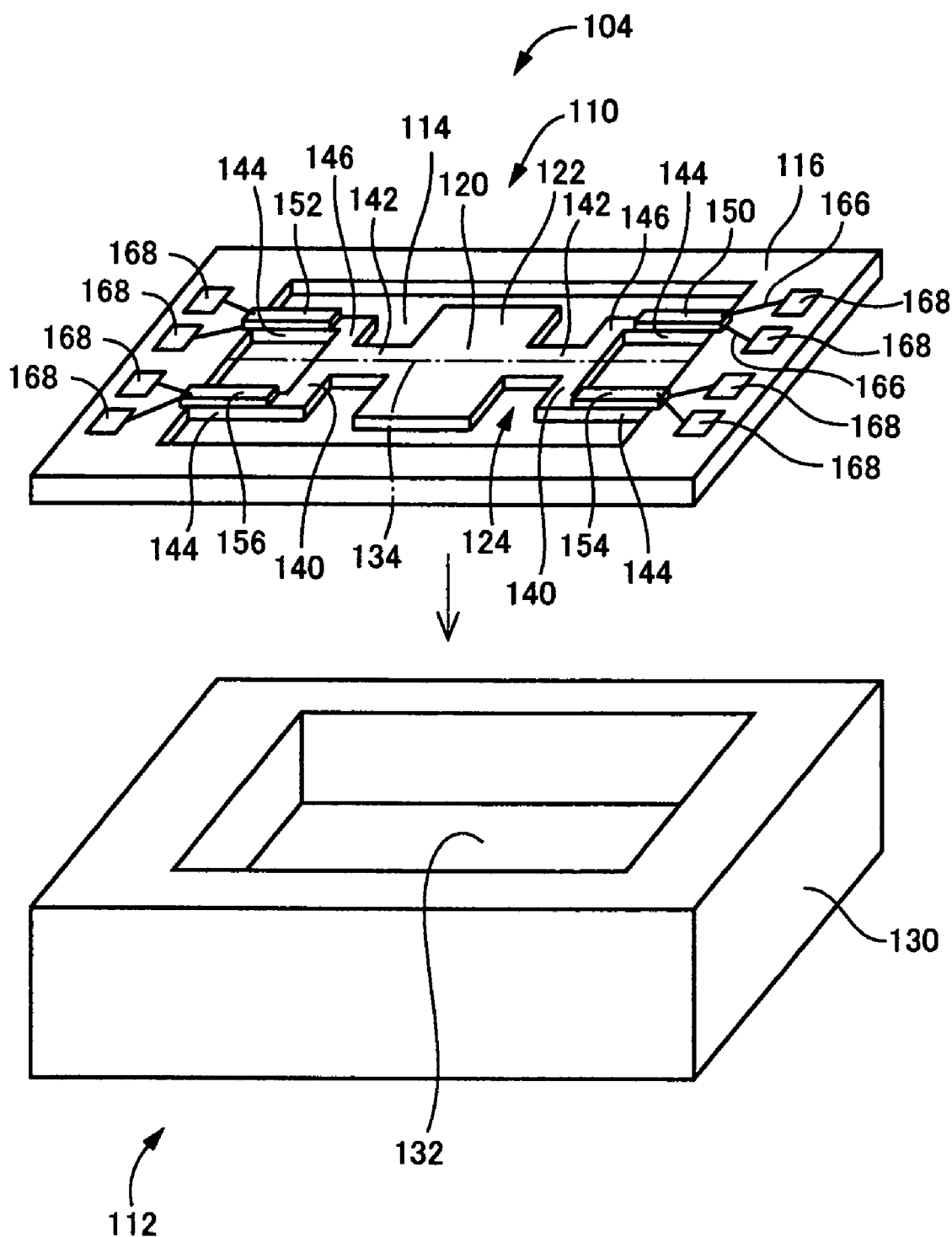
FIG. 3 is an exploded perspective view illustrating the optical scanner 104 depicted in FIG. 1.

FIG. 2 illustrates the optical scanner 104 in perspective view in an assembled state, while FIG. 3 illustrates the optical scanner 104 in exploded perspective view. As illustrated in FIGS. 2 and 3, the optical scanner 104 is fabricated by attaching a main body 110 to a base 112.

The main body 110 is made up of a material having elasticity such as silicon. As illustrated at the top of FIG. 3, the main body 110 is generally in the form of an elongate-rectangular thin-plate having a through hole 114 allowing light to pass therethrough.

The main body 110 includes, in an outer area thereof, a fixed frame 116, and on the other hand, includes, in an inner area thereof, an oscillating body 124 having a reflective mirror member 122 at which a reflective surface 120 is formed.

Correspondingly to this configuration of the main body 110, the base 112, as illustrated at the bottom of FIG. 3, is configured to include a support 130 on which the fixed frame 116 is to be mounted, with the base 112 being attached to the main body 110. The base 112 is further configured to also include a recess 132 opposing to the oscillating body 124.

The recess 132 is shaped in the base 112 for providing clearance for angular oscillation of the oscillating body 124 by vibration without interference with the base 112, with the main body 110 being attached to the base 112.

As illustrated in FIG. 3, the reflective surface 120 of the reflective mirror member 122 is oscillated about an oscillation axis 134 which is also a line of symmetry of the reflective surface 120. The oscillating body 124 further includes a pair of beam members 140, 140 extending from the reflective mirror member 122 in a coplanar relationship for connection of the reflective mirror member 122 with the fixed frame 116. In the present embodiment, the pair of beam members 140, 140 extend out of opposite lateral faces of the reflective mirror member 122 in opposite directions, respectively.

Each beam member 140 is configured to include a mirror-side leaf spring 142, a pair of frame-side leaf springs 144, 144, and a connection 146 interconnecting the mirror-side leaf spring 142 and the pair of frame-side leaf springs 144, 144.

Each mirror-side leaf spring 142, belonging to a corresponding one of the pair of beam members 140, 140, extends from a corresponding one of the lateral faces of the reflective mirror member 122 which are opposed to each other in the direction of the oscillation axis 134. Each mirror-side leaf spring 142 extends from the corresponding lateral face into a corresponding one of the connections 146, 146 in and along the oscillation axis 134.

The pair of frame-side leaf springs 144, 144, belonging to a corresponding one of the pair of beam members 140, 140, coextend from a corresponding one of the connections 146, 146 along the oscillation axis 134, such that these beam members 140, 140 are offset oppositely with respect to the oscillation axis 134.

As illustrated in FIG. 3, for each beam member 140, actuators 150 and 152 or 154 and 156 are attached to the pair of frame-side leaf springs 144, 144, respectively, such that the actuators 150, 152, 154, and 156 extend to the fixed frame 116.

Figure 4:
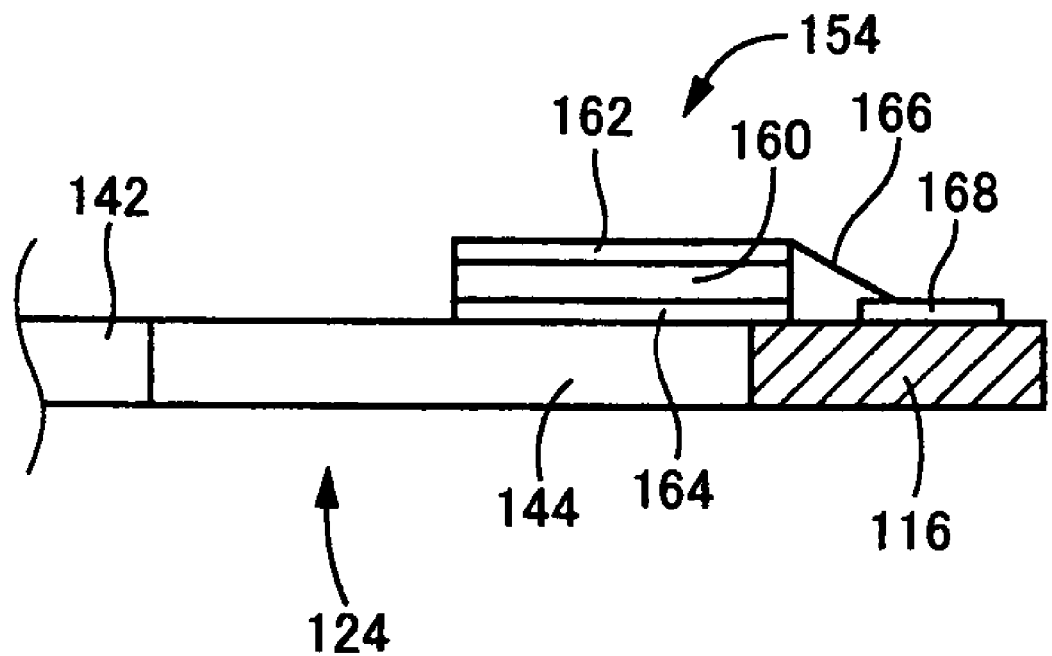
FIG. 4 is a longitudinal cross section in-part illustrating a vibrating body 124 depicted in FIG. 2.

As illustrated in FIG. 4, these actuators 150, 152, 154, and 156 are each fabricated principally with a piezoelectric material 160 (which is also referred to as "piezoelectric vibrator" or "piezoelectric element"). The piezoelectric material 160 is attached to one of both sides of the oscillating body 124, in the form of a thin plate, and is sandwiched between an upper electrode 162 and a lower electrode 164 which are opposed in a direction perpendicular to the plane of the oscillating body 124 onto which the piezoelectric material 160 is attached.

As illustrated in FIGS. 3 and 4, the upper electrode 162 and the lower electrode 164 are connected via corresponding respective lead wires 166, with a pair of terminals 168, 168 disposed at the fixed frame 116.

Figure 5:
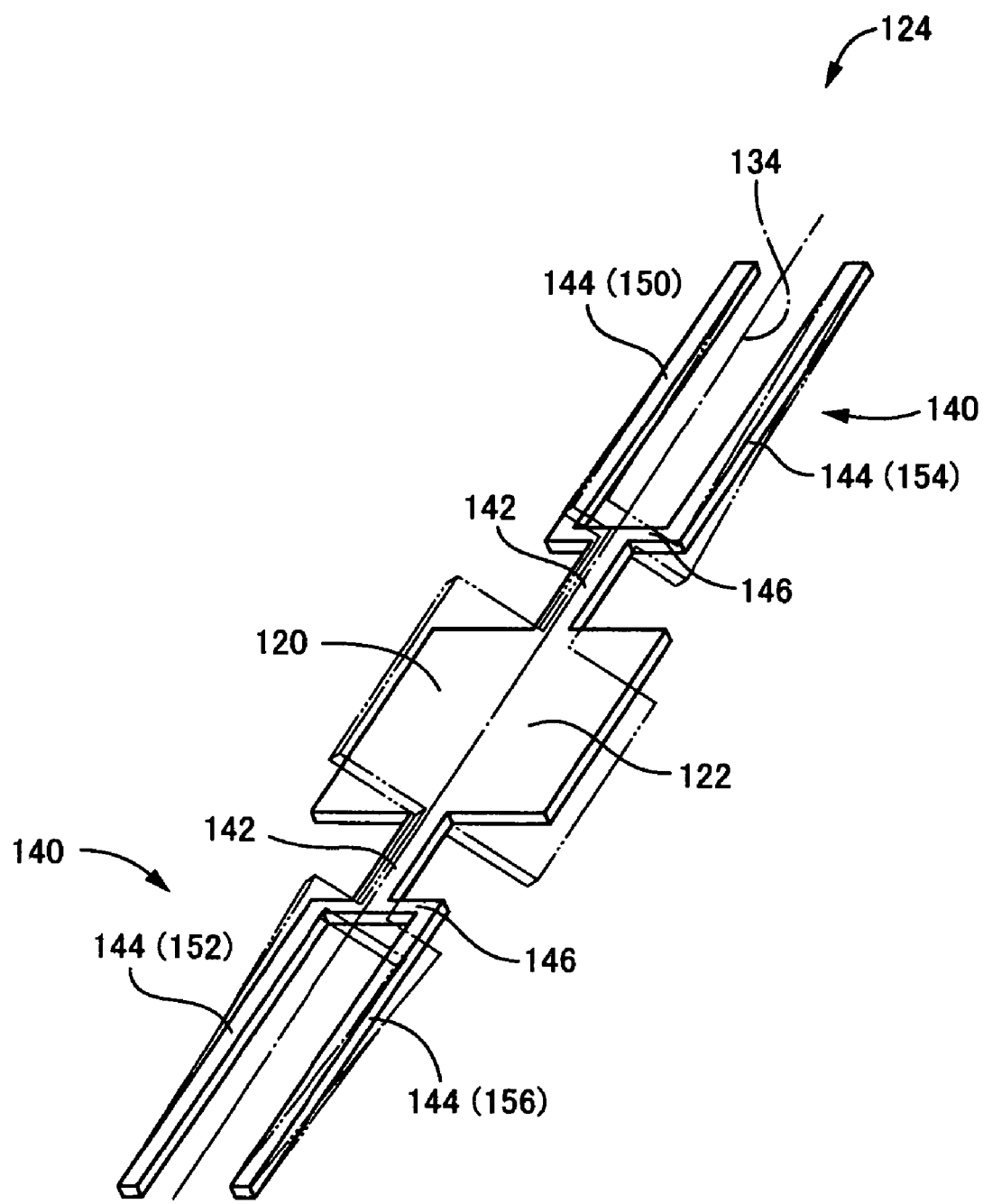
FIG. 5 is a perspective view illustrating the vibrating body 124 depicted in FIG. 2.

Application of a voltage to these upper and lower electrodes 162, 164 causes the piezoelectric material 160 to produce mechanical distortion in a direction perpendicular to that in which the voltage is applied. As illustrated in FIG. 5, the displacement causes each beam member 140 to produce flexure or deflection.

The flexure is produced such that a connection of each beam member 140 with the fixed frame 116 acts as a fixed end, while a connection of each beam member 140 with the reflective mirror member 122 acts as a free end. As a result, the free end displaces upwardly or downwardly depending on whether the flexure is produced upwardly or downwardly.

As is evident from FIG. 5, among the four actuators 150, 152, 154, and 156 attached to the four frame-side leaf springs 144, 144, 144, 144, respectively, a pair of the actuators 150 and 152 are located on one of both sides with respect to the oscillation axis 134, with the reflective mirror member 122 being interposed between these actuators 150 and 152, while a pair of the actuators 154 and 156 are located on the other side, with the reflective mirror member 122 being interposed between these actuators 154 and 156.

The pair of actuators 150 and 152 are deflected such that free ends of the corresponding respective two piezoelectric materials 160 and 160 are displaced in the same direction, and similarly, the pair of actuators 154 and 156 are deflected such that free ends of the corresponding respective two piezoelectric materials 160 and 160 are displaced in the same direction.

In contrast, a pair of the actuators 150 and 154 are located on one of both sides with respect to the reflective mirror member 122, with the oscillation axis 134 being interposed between these actuators 150 and 154, while a pair of the actuators 152 and 156 are located on the other side, with the oscillation axis 134 being interposed between these actuators 152 and 156.

The pair of actuators 150 and 154 are deflected such that free ends of the corresponding respective two piezoelectric materials 160 and 160 are displaced in opposite directions, and similarly, the pair of actuators 152 and 156 are deflected such that free ends of the corresponding respective two piezoelectric materials 160 and 160 are displaced in opposite directions.

As illustrated in FIG. 5, as a result of the above-described arrangement, the reflective mirror member 122 is rotated in an alternately-selected one of opposite rotational directions, owing to both the displacement produced in a first direction by the pair of actuators 150 and 152 located on one of both sides with respect to the oscillation axis 134, and the displacement produced in a second direction by the pair of actuators 152 and 156 located on the other side, wherein the second direction being opposite to the first direction.

That is to say, each frame-side leaf spring 144 has the function to convert linear displacement (lateral displacement) of the piezoelectric material 160 attached to each frame-side leaf spring 144 into flexure or bending motion (longitudinal displacement) thereof, while each connection 146 has the function to convert the flexure or bending motion of each frame-side leaf spring 144 into rotational motion of each mirror-side leaf spring 142. The rotational motion of the mirror-side leaf spring 142 causes the rotation of the reflective mirror member 122.

Therefore, in the present embodiment, for controlling of the four actuators 150, 152, 154, and 156, the two actuators 150 and 152, which are positioned on one of both sides with respect to the oscillation axis 134, that is, the upper right-hand actuator 150 and the upper left-hand actuator 152 as illustrated in FIG. 3 constitute a first pair. In addition, the two actuators 154 and 156, which are positioned on the opposite side, that is, the lower right-hand actuator 154 and the lower left-hand actuator 156 as illustrated in FIG. 3 constitute a second pair.

In the present embodiment, first voltages alternating in the same phase are applied to the two actuators 150 and 152 constituting the first pair, respectively, and second voltages alternating in the same phase are applied to the two remaining actuators 154 and 156 constituting the second pair, respectively, with the first and second voltages being opposite in phases.

This voltage application is performed for deflecting the first and second pairs in opposite directions, to thereby cause the reflective mirror member 122 to produce reciprocal rotation, that is, angular oscillation about the oscillation axis 134.

As a result, when both the two actuators 150 and 152 constituting the first pair are concurrently deflected downwardly as illustrated in FIG. 3, both the two remaining actuators 154 and 156 constituting the second pair are concurrently deflected upwardly as illustrated in FIG. 3.

Figure 6:
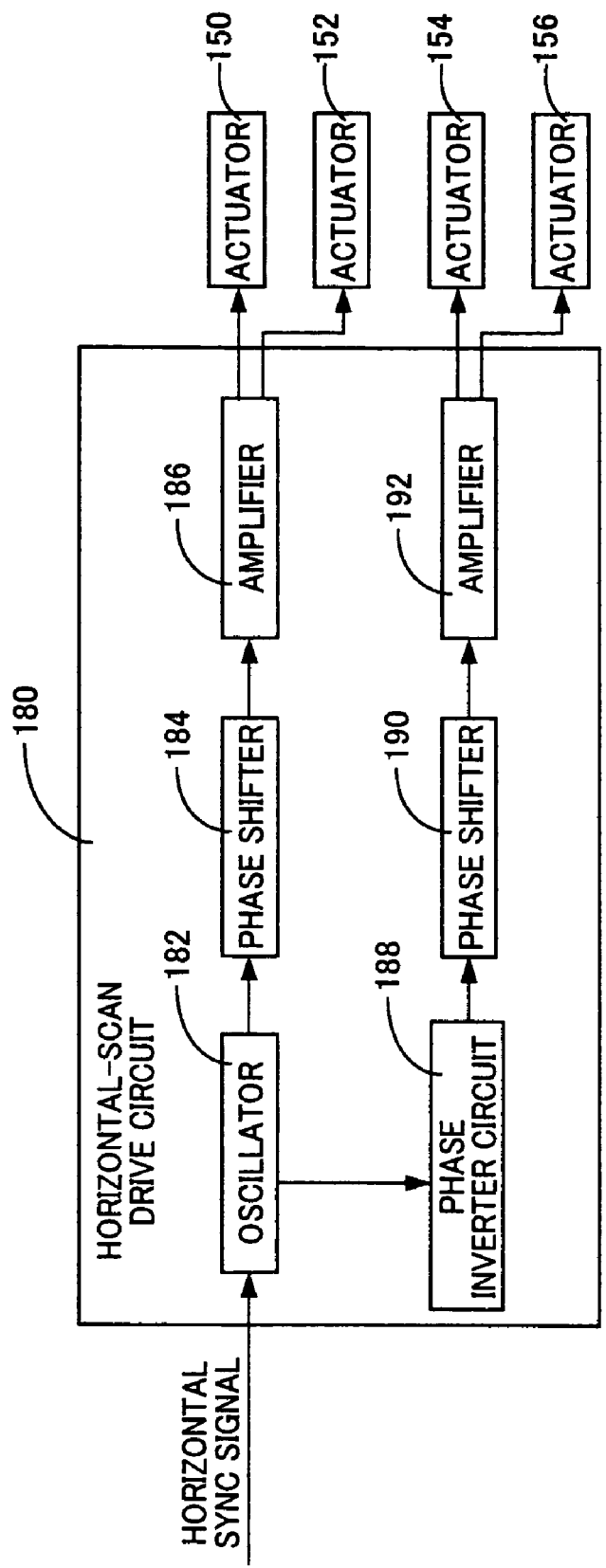
FIG. 6 is a block diagram illustrating the hardware construction of a horizontal-scan drive circuit 180 depicted in FIG. 1.

In order to achieve the above-described control, the horizontal scanning sub-system 100 includes a horizontal-scan drive circuit 180 illustrated in FIG. 1. For the horizontal-scan drive circuit 180, as illustrated in FIG. 6, an oscillator 182 generates an alternating voltage signal in response to the horizontal sync signal entered from the signal processing circuit 60.

The oscillator 182 is electrically coupled with the two actuators 150 and 152 constituting the first pair, via a first electrical pathway through a phase shifter 184 and an amplifier 186. The oscillator 182 is also electrically coupled with the two actuators 154 and 156 constituting the second pair, via a second electrical pathway through a phase inverter circuit 188, a phase shifter 190, and an amplifier 192.

The phase inverter circuit 188 is adapted to invert in phase the alternating voltage signal, upon receipt from the oscillator 182, and supplies the inverted alternating voltage signal to the phase shifter 190. Because the phase inverter circuit 188 is provided only for the second electrical pathway, the two actuators 150 and 152 constituting the first pair and the two remaining actuators 154 and 156 constituting the second pair are opposite in the phase of the alternating voltage signals supplied from the corresponding respective amplifiers 186 and 192.

The phase shifters 184 and 190 are provided for the function, which is in common to both the first and second electrical pathways, that the alternating voltage signals to be supplied to the actuators 150, 152, 154, and 156 are varied in phase for successful synchronization between the video signal and the oscillation of the reflective mirror member 122.

As illustrated in FIG. 1, the laser beam, upon scanned horizontally by the optical scanner 104 described above, is directed by a relay optical system 212 to the vertical scanning sub-system 102.

This RSD is provided with a beam detector 200 at a fixed position relative to this RSD. The beam detector 200 detects a laser beam which has been deflected by the optical scanner 104 (i.e., a laser beam which has been scanned in a primary scan direction), to thereby measure the position of the scanned laser beam in the primary scan direction. An example of the beam detector 200 may be a photodiode.

The beam detector 200 outputs a BD signal indicating that a scanned laser beam has reached a predetermined position, and the output BD signal is delivered to the signal processing circuit 60. In response to the delivery of the BD signal from the beam detector 200, the signal processing circuit 60 applies appropriate drive signals to the respective laser drivers 70, 72, and 74, upon elapse of a predetermined length of time since the beam detector 200 detected latest the laser beam.

This identifies the timing at which displaying an image is to be initiated on a per scan-line basis, and at the identified timing, displaying an image is initiated on a per scan-line basis.

In contrast to the horizontal scanning sub-system 100 which has been described above, the vertical scanning sub-system 102 includes a galvano mirror 210 as an oscillating mirror that causes mechanical deflection of a laser beam incident thereon.

The galvano mirror 210 is disposed to allow entry into the galvano mirror 210 of a laser beam after exiting the horizontal scanning sub-system 100 and being converged by the relay optical system 194. The galvano mirror 210 is oscillated about an axis of rotation intersecting the optical axis of the laser beam entering the galvano mirror 210. The start-up timing and the rotational speed of the galvano mirror 210 is controlled in response to a vertical sync signal supplied from the signal processing circuit 60.

The horizontal scanning sub-system 100 and the vertical scanning sub-system 102 both described above cooperate together to scan a laser beam two-dimensionally, and image light formed by the scanned laser beam enters the viewer's eye 10 via a relay optical system 214. In the present embodiment, the relay optical system 214 includes a plurality of relay optical elements 216 and 218 in an array along the optical path of the laser beam.

Figure 16:
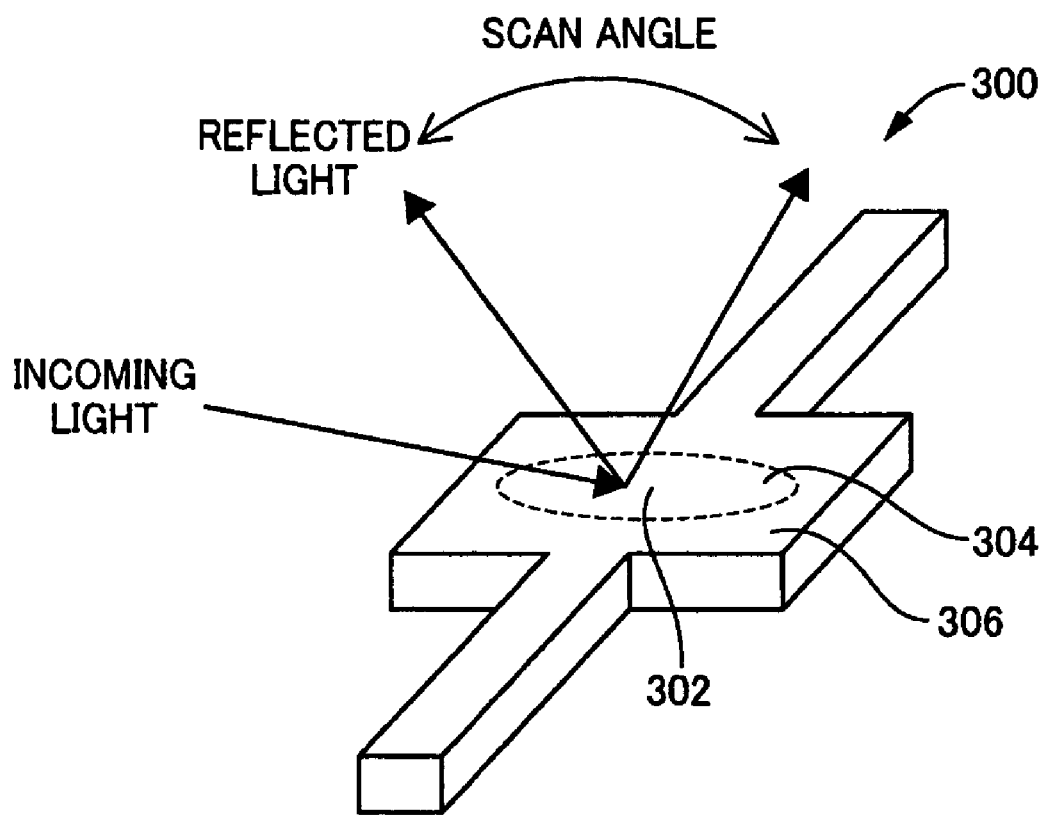
FIG. 16 is a perspective view for explaining a diameter of a beam of illuminating light for use in a conventional optical scanner 300.

As illustrated in FIG. 16, a conventional optical scanner 300 is configured concerning a beam diameter of a laser beam generally circular in section, which illuminates a reflective surface 302, on a light-entrance condition that the laser beam enters the reflective surface 302 without overflow therefrom.

More specifically, the beam diameter is dimensioned to form a non-entrance region 306 which light does not enter, between a light-entrance region 304 at which a laser beam enters the reflective surface 302, and an outer periphery of the reflective surface 302, for continuous satisfaction of the above light-entrance condition irrespective of unintended variations in quality between manufactures and temporal changes in quality of individual manufactures.

In contrast, for the optical scanner 104 in the present embodiment, a laser beam generally circular in section, which illuminates the reflective surface 120, is dimensioned in diameter to allow a portion of the laser beam to be overflown from the reflective surface 120.

More specifically, in the present embodiment, the beam diameter of the laser beam is predetermined to allow the laser beam to fill an entire region of the reflective surface 120, resulting in the beam diameter exceeding a maximum dimension of the reflective surface 120.

Figure 7:
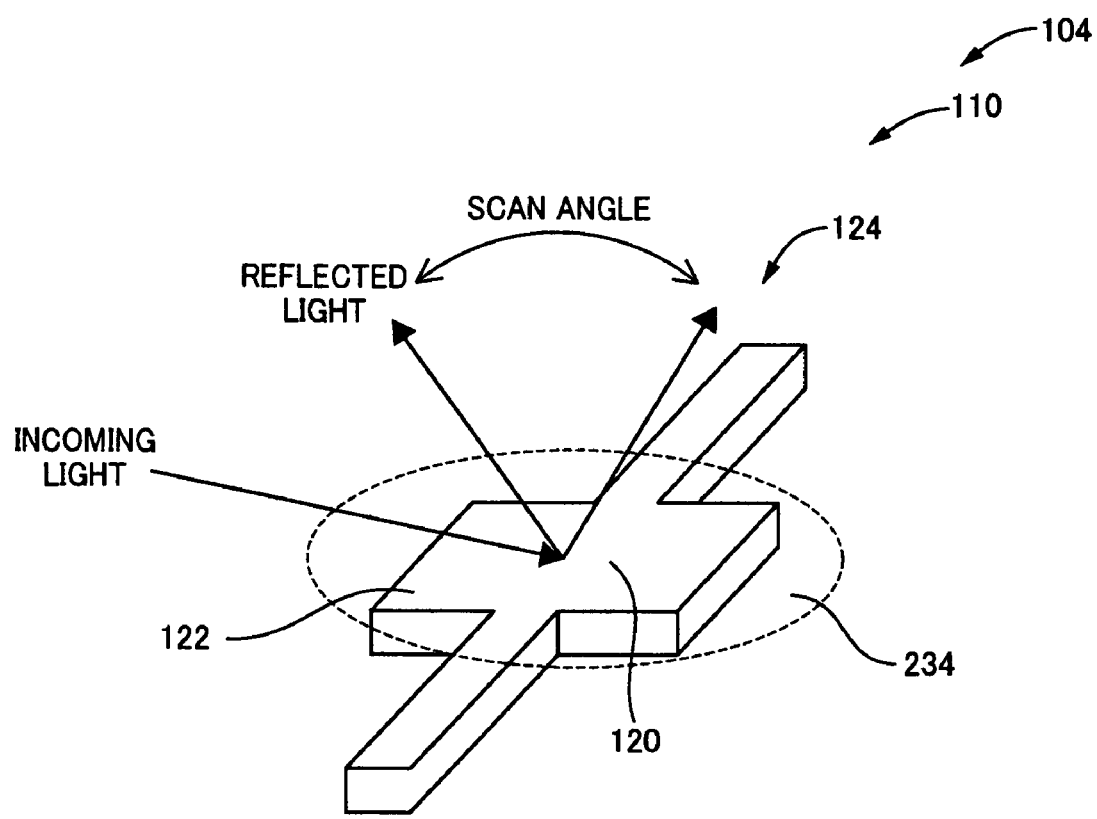
FIG. 7 is a perspective view for explaining a diameter of a beam of illuminating light for use in the optical scanner 104 depicted in FIG. 2.

As a result of the beam diameter being dimensioned in a manner mentioned above, in the present embodiment, as illustrated in FIG. 7, it follows that a laser beam directed toward the reflective surface 120 is provided a transverse cross-section 234 larger than the reflective surface 120. Accordingly, an entirety of illuminating light which is a laser beam directed toward the reflective surface 120 includes a desired segment of light which is incoming light entering the reflective surface 120, and an undesired segment of light which does not enter the reflective surface 120.

Figure 8:
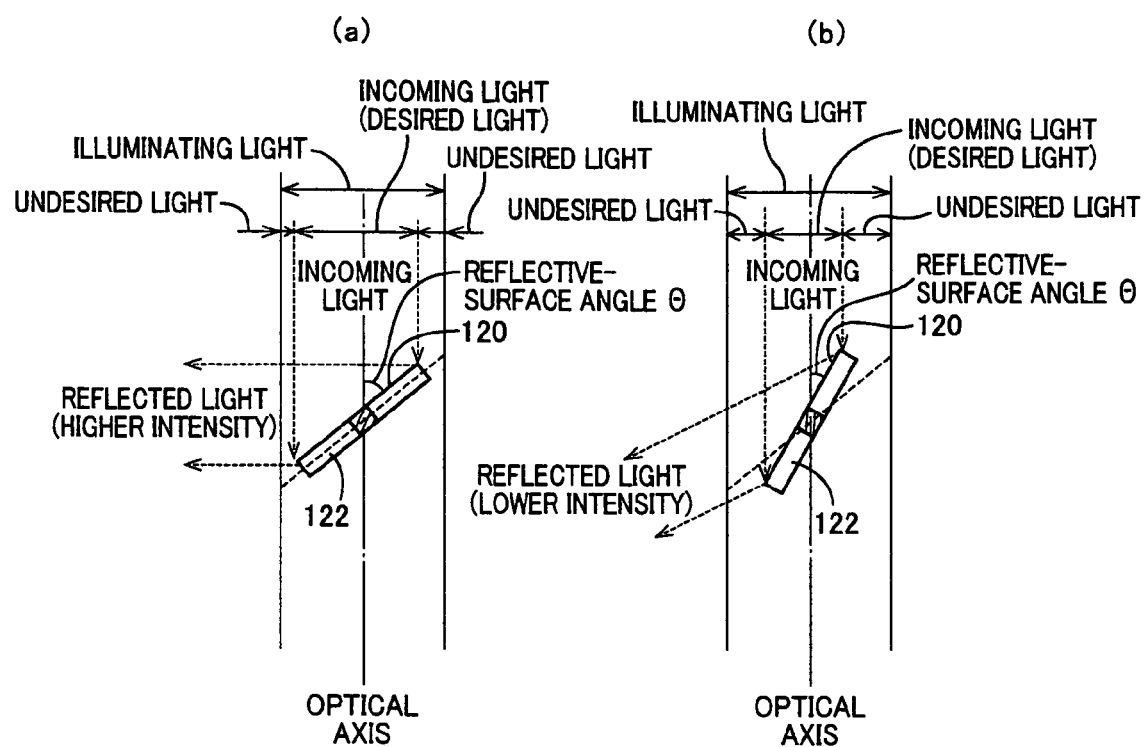
FIG. 8 is an optical path diagram for explaining variations in the transverse cross-sectional areas of incoming light to and reflected light from a reflective surface 120 depicted in FIG. 7.

For the above reasons, in the present embodiment, as illustrated in FIG. 8, a transverse cross-sectional area of the incoming light in confrontation with the reflective surface 120, which is to say, an area of an entrance region in which the incoming light enters the reflective surface 120, as projected in an entry direction of the incoming light (hereinafter, referred to as "projection area of entrance region"), is varied as an angle of the reflective surface 120 relative to the entry direction of the incoming light (hereinafter, referred to simply as "reflective-surface angle θ") is altered between maximum and minimum angles.

In this context, the term "reflective-surface angle θ" is defined to mean a smaller one of two angles formed at an intersection of an optical axis of the incoming light and a straight line approximately representative of the reflective surface 120, when the incoming light and the reflective surface 120 are viewed in a direction perpendicular to both the entry direction of the incoming light and a direction normal to the reflective surface 120 (i.e., a direction perpendicular to the sheet of FIG. 8).

FIG. 8(a) illustrates an optical path diagram for explaining the reflection on the reflective surface 120 occurring at a maximum of the reflective-surface angle θ. FIG. 8(a) also illustrates that the maximization of a transverse cross-sectional area of the incoming light in confrontation with the reflective surface 120 entails the maximization of a transverse cross-sectional area of the reflected light from the reflective surface 120.

In contrast, FIG. 8(b) illustrates an optical path diagram for explaining the reflection on the reflective surface 120 occurring at a minimum of the reflective-surface angle θ. FIG. 8(b) illustrates in broken lines a position of the reflective surface 120 when the reflective-surface angle θ is maximized, for comparative purposes. FIG. 8(b) still also illustrates that the minimization of a transverse cross-sectional area of the incoming light in confrontation with the reflective surface 120 entails the minimization of a transverse cross-sectional area of the reflected light from the reflective surface 120.

As described above, in the present embodiment, because of the dependency of each of the transverse cross-sectional area of the incoming light in confrontation with the reflective surface 120 and the transverse cross-sectional area of the reflected light from the reflective surface 120 upon a magnitude of the reflective-surface angle θ, the intensity of the reflected light would depend upon a magnitude of the reflective-surface angle θ, if no appropriate measures are taken.

Figure 9:
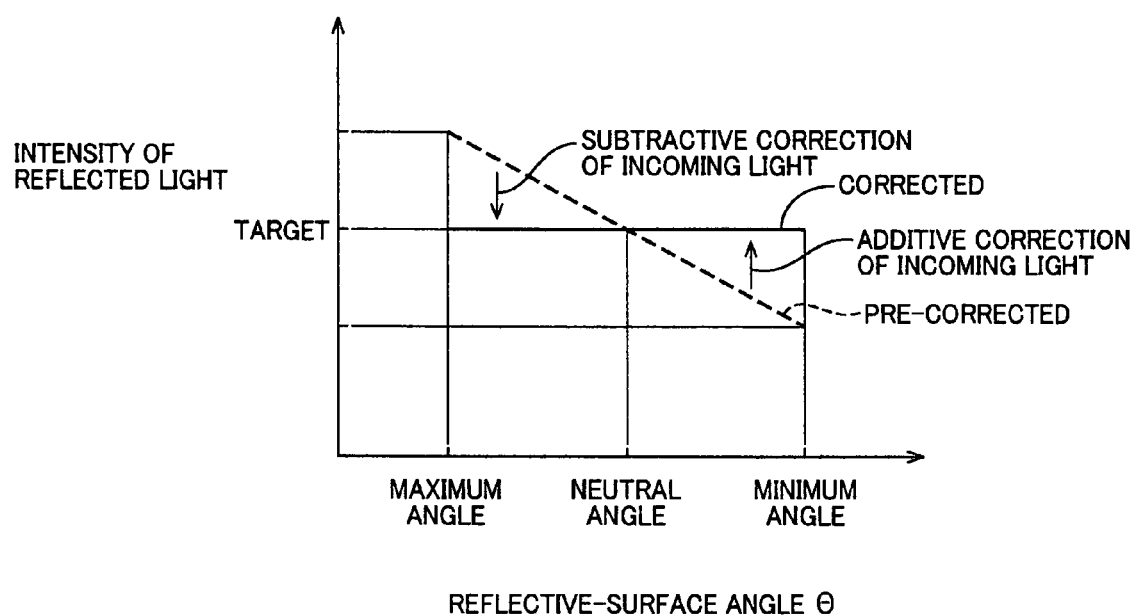
FIG. 9 is a graph illustrating a relationship between a reflective-surface angle θ and the intensity of the reflected light, as established in the optical scanner 104 depicted in FIG. 2.

More specifically, as illustrated in FIG. 9 in graph in broken lines, the intensity of the reflected light unavoidably depend upon the reflective-surface angle θ in a manner that, the maximization of the reflective-surface angle θ provides the maximization of the intensity of the reflected light, while the minimization of the reflective-surface angle θ provides the minimization of the intensity of the reflected light.

In the present embodiment, for eliminating such dependency, the control of the intensity of the incoming light in accordance with the reflective-surface angle θ is performed. The control is performed, as illustrated in FIG. 9, under a condition that a target intensity of the reflected light has been set to the intensity which the reflected light bears when the reflective-surface angle θ is equal to a neutral angle.

More specifically, the control is performed, such that a subtractive correction is implemented to decrease the intensity of the incoming light, over a range during which the reflective-surface angle θ is larger than the neutral angle, while an additive correction is implemented to increase the intensity of the incoming light, over a range during which the reflective-surface angle θ is smaller than the neutral angle.

The subtractive correction, which is an example of a decreasing correction, may be performed by subtraction or multiplication of an original intensity of the incoming light. Similarly, the additive correction, which is an example of an increasing correction, may be performed by addition or multiplication of an original intensity of the incoming light.

As a result, as illustrated in FIG. 9 in graph in solid lines, the intensity of the reflected light is held unchanged so as to substantially coincide with the target intensity of the reflected light, irrespective of variations in the reflective-surface angle θ.

Figure 10:
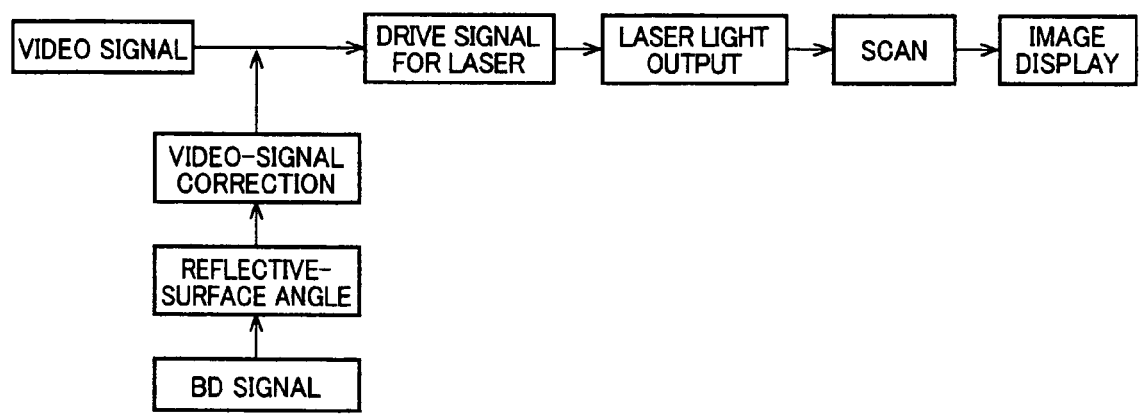
FIG. 10 is a block diagram schematically illustrating an overall processing in the retinal scanning type display device depicted in FIG. 1.

FIG. 10 illustrates in time series a schematic block diagram of an overall electrical and optical processing performed in the RSD constructed according to the present embodiment.

In the RSD, the drive signals for driving the lasers 30, 32, and 34 are generated in response to the externally-supplied video signal which defines desired colors and intensities of a desired image on a pixel-by-pixel basis. The generated drive signals are routed to the respective laser drivers 70, 72, and 74.

Upon receipt of the drive signals, the lasers 30, 32, and 34 emit the respective sub-beams of laser light into the scanning unit 24 in the form of a combined laser beam, allowing a scan of the laser beam. The thus-produced scanning laser beam is projected onto the retina 14 of the viewer, resulting in the presentation of a desired image to the viewer.

In the present embodiment, in order to stabilize or uniform the intensity of the reflected light irrespective of variations in the reflective-surface angle θ, the externally-supplied video signal is corrected to modulate the intensity of the incoming light in accordance with the reflective-surface angle θ. The reflective-surface angle θ is repeatedly detected each time the beam detector 200 detects a scanning laser beam emerging from the optical scanner 104.

For correcting the video signal in the above manner, the signal processing circuit 60 includes a video-signal corrector 240, as illustrated in FIG. 1. The video-signal corrector 240 is comprised of a portion of the computer of the signal processing circuit 60 which is assigned to execute a video-signal correction program.

Figure 11:
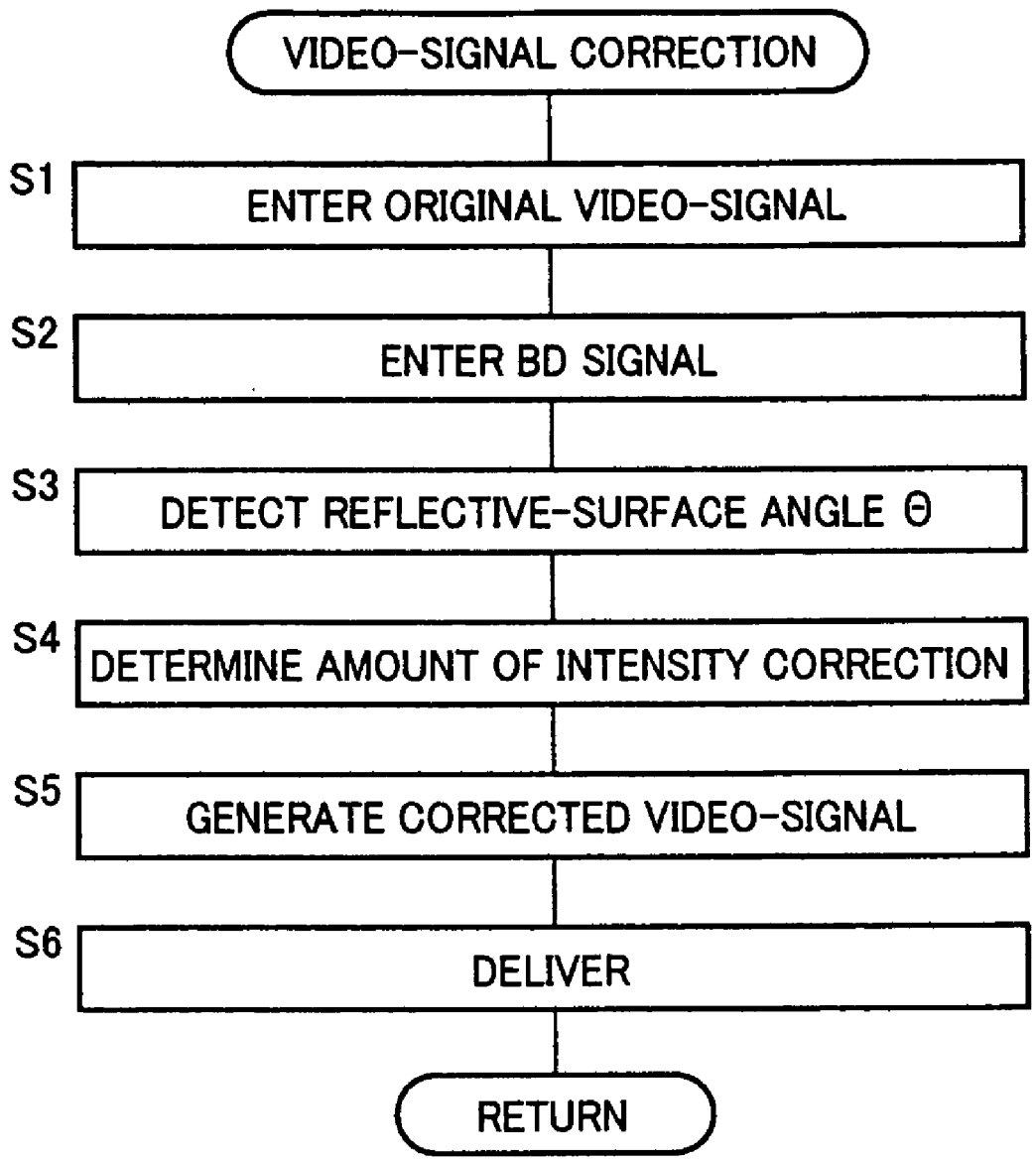
FIG. 11 is a flow chart schematically illustrating a video-signal correction program executed by a video-signal corrector 240 depicted in FIG. 1 via a computer.

FIG. 11 schematically illustrates in flow chart the video-signal correction program. The video-signal correction program is repeatedly executed.

Each cycle of execution of the video-signal correction program is initiated with a step S1 to enter the externally-supplied video signal as an original video signal. The step S1 is followed by a step S2 to enter from the beam detector 200 the BD signal indicating whether or not the beam detector 200 detected scanning light emerging from the optical scanner 104.

Subsequently, a step S3 is implemented to detect the reflective-surface angle θ in response to the entered BD signal. The step S3 is followed by a step S4 to determine or establish a current amount of intensity correction (i.e., a current amount or value of correction to the intensity of the incoming light entering the optical scanner 104), such that the current amount of intensity correction conforms with the detected value of the reflective-surface angle θ according to a correction-to-angle relationship.

The correction-to-angle relationship is predetermined between appropriate amounts of correction to the laser-light intensity represented by the original video signal and possible values of the reflective-surface angle θ, by allowing for a relationship between the reflective-surface angle θ and an intensity deviation of the reflected light (i.e., a difference between the target intensity and a pre-corrected or original intensity, both of the reflected or scanning light emerging from the optical scanner 104), as illustrated in FIG. 9 in graph. The correction-to-angle relationship has been previously stored in a memory of the computer of the signal processing circuit 60.

The step S4 is followed by a step S5 to correct the entered video signal in accordance with the determined current amount of intensity correction, resulting in the generation of a corrected video signal. For example, the corrected video signal is generated by adding the current amount of intensity correction to the original video signal, or by subtracting the current amount of intensity correction from the original video signal, depending on a relationship between a current value of the reflective-surface angle θ and the neutral angle.

The step S5 is followed by a step S6 to generate the drive signals from the corrected video signal, and to then deliver the generated drive signals to the respective laser drivers 70, 72, and 74.

Then, one cycle of execution of the video-signal correction program is terminated.

As is evident from the above description, in the present embodiment, the optical scanner 104 constitutes an example of the "optical scanner" according to the above mode (1), and the signal processing circuit 60 constitutes an example of the "controller" set forth in any one of the above modes (1) through (3).

Further, in the present embodiment, the RSD constitutes an example of the "apparatus" according to the above mode (5), the light source unit 20 constitutes an example of the "light source" set forth in the above mode (6), the signal processing circuit 60 constitutes an example of the "controller" set forth in the same mode, and the video-signal corrector 240 constitutes an example of the "signal corrector" set forth in the same mode.

Still further, in the present embodiment, the light source unit constitutes an example of the "light source" set forth in the above mode (8), the optical scanner 104 constitutes an example of the "primary scanning sub-system" set forth in the same mode, the galvano mirror 210 constitutes an example of the "secondary scanning sub-system" set forth in the same mode, and the signal processing circuit 60 constitutes an example of the "controller" set forth in the same mode.

Next, there will be described a retinal scanning type display device provided with an optical scanner constructed according to a second embodiment of the present invention.

The present embodiment is in common to the first embodiment concerning many elements, and is different from the first embodiment only concerning elements for controlling the intensity of the incoming light to the reflected surface 120.

In view of that, while the common elements of the present embodiment will be referenced the same reference numerals or names as those in the description and illustration of the first embodiment, without redundant description or illustration, the different elements of the present embodiment will be described in greater detail below.

In the first embodiment, to control the intensity of the incoming light entering the reflective surface 120 in accordance with the reflective-surface angle θ, there are employed intensity-modulation functions of the respective lasers 30, 32, and 34, which are primitive functions for image display.

Figure 12:
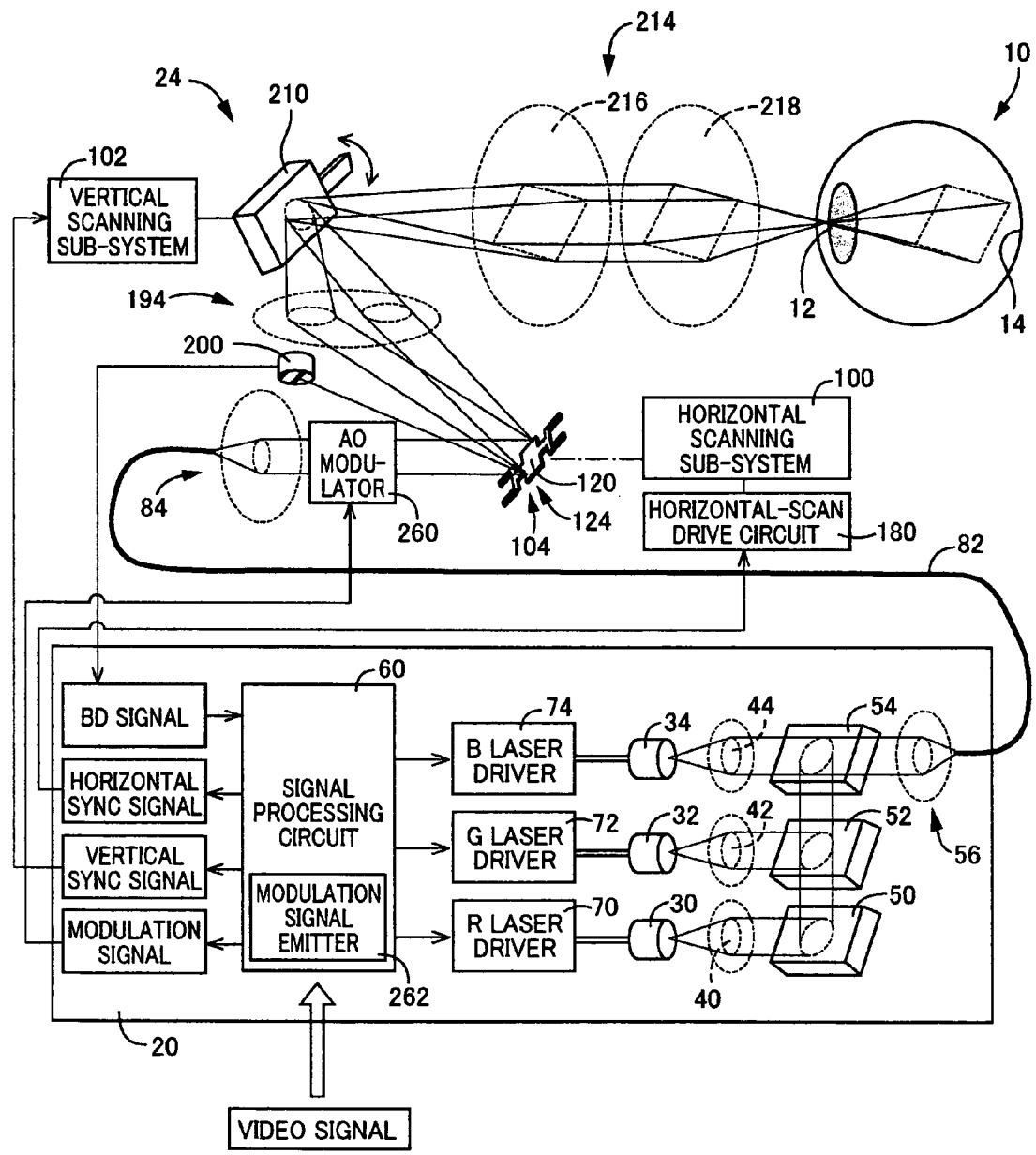
FIG. 12 is a schematic view illustrating a retinal scanning type display device including an optical scanner 104 constructed according to a second embodiment of the present invention.

In contrast, in the present embodiment, as illustrated in FIG. 12, for performing the intensity modulation of the incoming light entering the reflective surface 120, an acousto-optical (AO) modulator 260 is employed which is disposed between the light source unit 20 and the optical scanner 104. On the AO modulator 260, the sub-beams of laser light emitted from the respective lasers 30, 32, and 34, upon combined into a single laser beam, impinge.

In the present embodiment, no optics (for example, a lens, a mirror, etc.) is disposed between the AO modulator 260 and the reflective surface 120. In the present embodiment, by the use of the AO modulator 260, the intensity of the incoming light entering the reflective surface 120 is controlled in accordance with the reflective-surface angle θ.

For performing the above-mentioned control, the signal-processing circuit 60 is configured to include a modulation-signal emitter 262 emitting a modulation signal for delivery to the AO modulator 260, as illustrated in FIG. 12. In response to the modulation signal, the AO modulator 260 modulates the intensity of light which has exited from the light source unit 20 and which attempts to enter the optical scanner 104.

Figure 13:
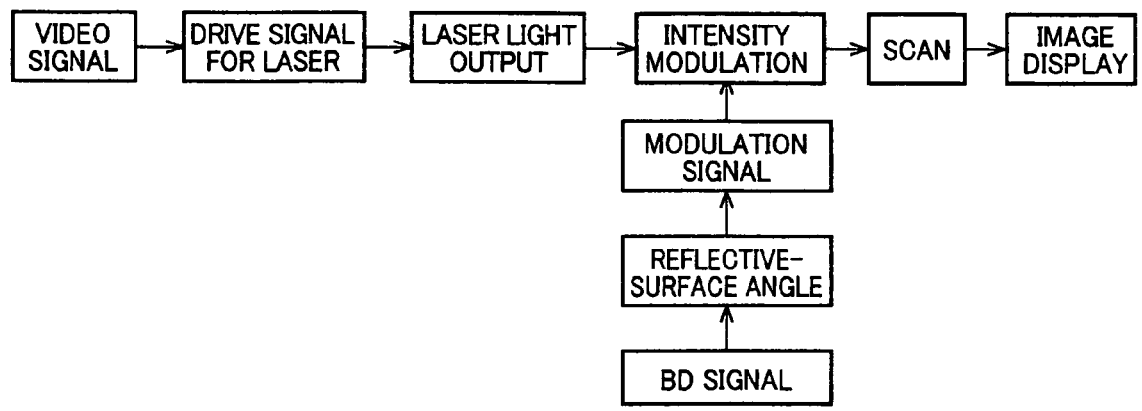
FIG. 13 is a block diagram schematically illustrating an overall processing in the retinal scanning type display device depicted in FIG. 12.

FIG. 13 illustrates in a block diagram similar to that of FIG. 10, the overall processing in the RSD constructed according to the present embodiment.

In the present embodiment, for the optical scanner 104 included in the horizontal scanning sub-system 100 which is configured to perform an optical scan at a higher rate than that of the vertical scanning sub-system 102, the intensity modulation of the incoming light entering the optical scanner 104 is performed in response to the modulation signal which has been determined in accordance with the reflective-surface angle θ. The reflective-surface angle θ is detected by referring to the BD signal delivered from the beam detector 200, in a similar manner to that in the first embodiment.

While the lasers 30, 32, and 34 are in common to the AO modulator 260 in that both are capable of modulating the intensity of a laser beam, the lasers 30, 32, and 34 are different from the AO modulator 260 because the lasers 30, 32, and 34 enable both increase and decrease in the intensity of a laser beam, while the AO modulator 260 enables only decrease in the intensity of a laser beam.

Figure 14:
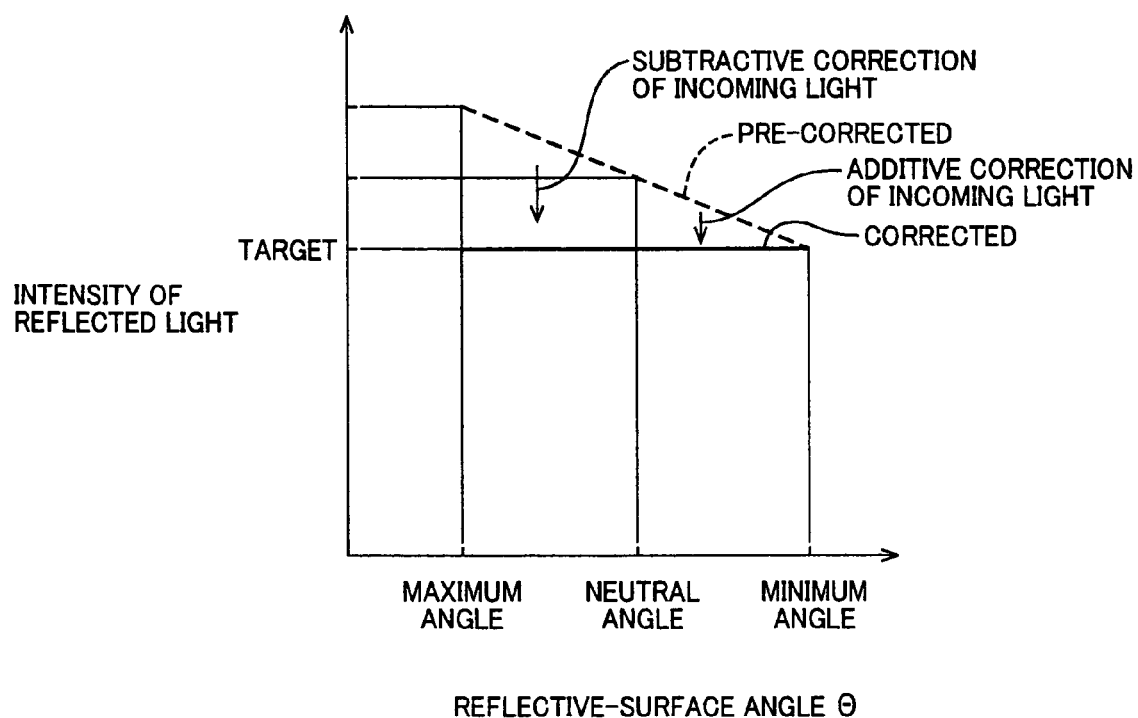
FIG. 14 is a graph illustrating a relationship between a reflective-surface angle θ and the intensity of reflected light, as established in the optical scanner 104 depicted in FIG. 12.

In the present embodiment, the intensity of the incoming light is controlled using the AO modulator 260 which, as described above, enables only decrease in the amount of light. Therefore, as illustrated in FIG. 14 in graph, the modulation-signal emitter 262 performs a subtractive correction to decrease the intensity of the incoming light entering the optical scanner 104, depending on the reflective-surface angle θ, when the reflective-surface angle θ is larger than the minimum angle.

More specifically, the subtractive correction is performed with the output power of the lasers 30, 32, and 34 preset such that the target intensity is equal to the intensity which the reflected light bears when the reflective-surface angle θ is equal to the minimum angle, which is to say, when the intensity of the reflected light is minimized. The subtractive correction, which is an example of a decreasing correction, may be performed by subtraction or multiplication of an original intensity of the incoming light.

The modulation-signal emitter 262 is comprised of a portion of the computer of the signal processing circuit 60 which is assigned to execute an intensity-modulation program.

Figure 15:
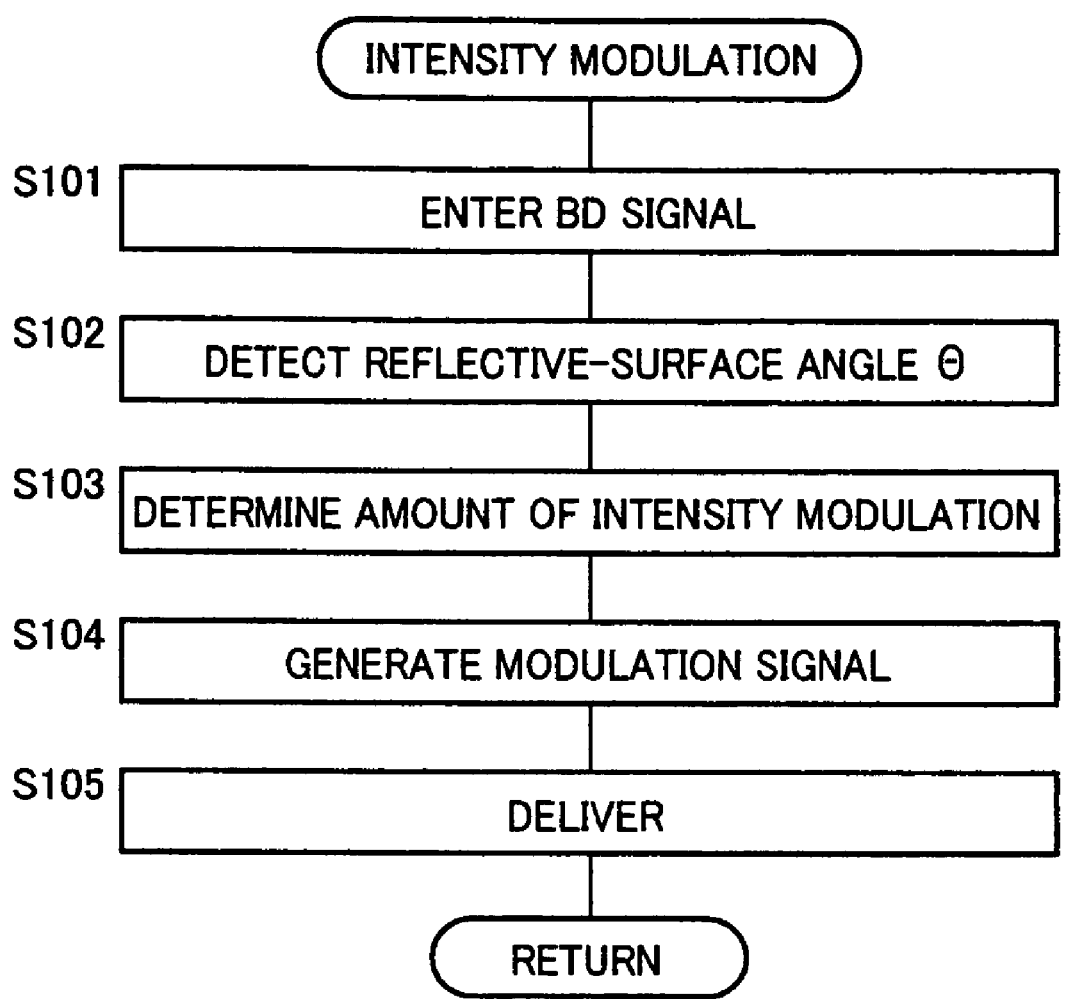
FIG. 15 is a flow chart schematically illustrating an intensity modulation program executed by a modulation-signal generator 262 depicted in FIG. 12 via a computer.

FIG. 15 schematically illustrates in flow chart the intensity-modulation program. The intensity-modulation program is repeatedly executed, as well.

Each cycle of execution of the intensity-modulation program is initiated with a step S101 to enter from the beam detector 200 the BD signal indicating whether or not the beam detector 200 detected scanning light emerging from the optical scanner 104. The step S101 is followed by a step S102 to detect the reflective-surface angle θ in response to the entered BD signal.

Subsequently, a step S103 is implemented to determine or establish a current amount of intensity modulation (i.e., a current amount or value of modulation to the intensity of the incoming light entering the optical scanner 104), such that the current amount of intensity modulation conforms with the detected value of the reflective-surface angle θ according to a modulation-to-angle relationship.

The modulation-to-angle relationship is predetermined between appropriate amounts of modulation to the laser-light intensity exiting the light source unit 20 (i.e., the intensity of the incoming light) and possible values of the reflective-surface angle θ, by allowing for a relationship between the reflective-surface angle θ and an intensity deviation of the reflected light (i.e., a difference between the target intensity and a pre-corrected or original intensity, both of the reflected or scanning light emerging from the optical scanner 104), as illustrated in FIG. 14 in graph. The modulation-to-angle relationship has been previously stored in the memory of the computer of the signal processing circuit 60.

The step S103 is followed by a step S104 to generate the modulation signal in accordance with the determined current amount of intensity modulation. The step S104 is followed by a step S105 to deliver the generated modulation signal to the AO modulator 260.

Then, one cycle of execution of the intensity-modulation program is terminated.

As is evident from the above description, in the present embodiment, the optical scanner 104 constitutes an example of the "optical scanner" according to the above mode (1), the signal processing circuit 60 constitutes an example of the "controller" set forth in any one of the above modes (1), (2) or (4), and the AO modulator 260 constitutes an example of the "modulator" set forth in the above mode (4).

Further, in the present embodiment, the RSD constitutes an example of the "image forming apparatus" according to the above mode (5), the signal processing circuit 60 constitutes an example of the "controller" set forth in the above modes (5) or (7), the modulation-signal emitter 262 constitutes an example of the "signal generator" set forth in the above mode (7), and the AO modulator 260 constitutes an example of the "modulator" set forth in the same mode.

It is added that, in the several embodiments described above, the intensity of the illuminating light directed toward the optical scanner 104 (including a desired segment of light entering the optical scanner 104, and an undesired segment of light not entering the optical scanner 104) is varied depending on the reflective-surface angle θ, for the purpose of stabilizing the intensity of the scanning light emerging from the optical scanner 104, or the reflected light from the optical scanner 104, resulting in more successful display of images.

In contrast, the present invention may be alternatively practiced in a mode that the intensity of the illuminating light directed toward the optical scanner 104 is varied depending on the reflective-surface angle θ, for the purpose of concurrently achieving both the ensured detection of a laser beam by the beam detector 200 and the optimization of the intensity of a laser beam to be projected onto the retina 14 (for example, limiting the amount of a laser beam exposure to the retina 14 of the viewer, so as to prevent the viewer from feeling too glaring).

More specifically, the present invention may be practiced, for example, in a mode that the intensity of the illuminating light directed toward the optical scanner 104 is varied depending on the reflective-surface angle θ, so that the scanning light emerging from the optical scanner 104 enters the beam detector 200 with higher intensity, while it enters the retina 14 with lower intensity.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An optical scanner comprising:
   a reflective surface from which incoming light is reflected;
   a scanning mechanism altering a reflective-surface angle of the reflective surface, relative to an entry direction in which the incoming light enters the reflective surface, to thereby scan reflected light from the reflective surface; and
   a controller controlling an intensity of the incoming light, depending on the reflective-surface angle.

2. The optical scanner according to claim 1, wherein the incoming light is varied in transverse cross-sectional area on the reflective surface, as a function of the reflective-surface angle, and wherein the controller varies the intensity of the incoming light as a function of the reflective-surface angle, so as to reduce an amount of variation in an intensity of the reflected light from the reflective surface due to variation of the reflective-surface angle.

3. The optical scanner according to claim 1, wherein the optical scanner is for use in combination with a light source emitting light toward the reflective surface and modulating an intensity of the light to be emitted from the light source, in accordance with a first signal, wherein the controller controls the first signal to be supplied to the light source, depending on the reflective-surface angle.

4. The optical scanner according to claim 1, wherein the optical scanner is for use in combination with a light source emitting light toward the reflective surface and a modulator modulating an intensity of the light which has been emitted from the light source, in accordance with a second signal, wherein the controller controls the second signal to be supplied to the modulator, depending on the reflective-surface angle.

5. An apparatus for forming an image by scanning a beam of light, comprising:
   a light source emitting the beam of light; and
   a scanning unit scanning the beam of light emitted from the light source, the scanning unit including an optical scanner,
   wherein the optical scanner comprises:
   a reflective surface from which an incoming beam of light from the light source is reflected;
   a scanning mechanism altering a reflective-surface angle of the reflective surface, relative to an entry direction in which the incoming beam of light enters the reflective surface, to thereby scan reflected light from the reflective surface; and
   a controller controlling an intensity of the incoming beam of light, depending on the reflective-surface angle.

6. The apparatus according to claim 5, wherein the light source modulates an intensity of the beam of light emitted from the light source, in accordance with an image signal corresponding to the image, and wherein the controller includes a signal corrector correcting the image signal to be supplied to the light source, depending on the reflective-surface angle.

7. The apparatus according to claim 5, further comprising a modulator modulating the intensity of the beam of light emitted from the light source, in accordance with a modulation signal, wherein the controller includes a signal generator generating the modulation signal, depending on the reflective-surface angle, and delivering the generated modulating signal to the modulator.

8. The apparatus according to claim 5, wherein the light source emits the beam of light toward the reflective surface, such that the emitted beam of light is so dimensioned in transverse cross-section as to together generate a desired segment of light entering the reflective surface and an undesired segment of light not entering the reflective surface.

9. The apparatus according to claim 8, wherein the scanning unit includes:

a primary scanning sub-system scanning the beam of light emitted from the light source in a primary scan direction; and a secondary scanning sub-system scanning the beam of light emitted from the light source in a secondary scan direction intersecting the primary scan direction at a rate lower than that of the primary scanning sub-system, wherein the primary scanning sub-system includes the optical scanner, and wherein the controller controls an intensity of the incoming beam of light entering the reflective surface, depending on the reflective-surface angle of the reflective surface included in the optical scanner for use in the primary scanning sub-system.

* * * * *